(12) United States Patent  
Mowbray et al.

(10) Patent No.: US 9,213,089 B2  
(45) Date of Patent: Dec. 15, 2015

(54) RADAR CLUTTER SUPPRESSION SYSTEM

(71) Applicant: Navico Holding AS, Lysaker (NO)

(72) Inventors: Robert Stephen Mowbray, Scotland (GB); Roger Phillips, Auckland (NZ)

(73) Assignee: Navico Holding AS, Lysaker (NO)

( * ) Notice: Subject to any disclaimer, the term of this patent is extended or adjusted under 35 U.S.C. 154(b) by 0 days.

(21) Appl. No.: 14/617,326

(22) Filed: Feb. 9, 2015

(65) Prior Publication Data

US 2015/0153446 A1    Jun. 4, 2015

Related U.S. Application Data

(62) Division of application No. 13/474,289, filed on May 17, 2012.

(60) Provisional application No. 61/487,048, filed on May 17, 2011.

(51) Int. Cl.
| | |
|---|---|
| *G01S 7/292* | (2006.01) |
| *G01S 7/34* | (2006.01) |
| *G01S 7/41* | (2006.01) |
| *G01S 13/52* | (2006.01) |
| *G01S 13/02* | (2006.01) |
| *G01S 13/524* | (2006.01) |

(52) U.S. Cl.
CPC ............. *G01S 13/02* (2013.01); *G01S 7/2922* (2013.01); *G01S 7/2925* (2013.01); *G01S 7/2927* (2013.01); *G01S 7/34* (2013.01); *G01S 7/414* (2013.01); *G01S 13/5242* (2013.01); *G01S 13/5244* (2013.01)

(58) Field of Classification Search
CPC ............ G01S 7/2813; G01S 7/292–7/2927; G01S 7/34; G01S 7/414; G01S 13/5242; G01S 13/5244
USPC ........................................ 342/159–164, 205
See application file for complete search history.

(56) References Cited

U.S. PATENT DOCUMENTS

| | | | |
|---|---|---|---|
| 3,383,422 A | | 5/1968 | MacArthur et al. |
| 3,949,398 A | * | 4/1976 | Donahue .......................... 342/92 |
| 4,031,364 A | | 6/1977 | Wilmot |
| 4,093,948 A | | 6/1978 | Long, III |
| 4,095,222 A | * | 6/1978 | Mooney, Jr. .................... 342/93 |
| 4,104,633 A | * | 8/1978 | Donahue et al. ................ 342/93 |
| 4,377,811 A | * | 3/1983 | Mooney et al. ................. 342/94 |
| 4,386,353 A | * | 5/1983 | Bleijerveld et al. ............ 342/91 |
| 4,394,658 A | * | 7/1983 | Short, III ........................ 342/99 |
| 4,415,897 A | * | 11/1983 | Kennedy ....................... 342/205 |
| 4,503,432 A | | 3/1985 | Bailey |
| 4,509,050 A | * | 4/1985 | Amoroso et al. ............... 342/91 |
| 4,542,381 A | * | 9/1985 | Wilhelm ......................... 342/93 |
| 4,684,950 A | | 8/1987 | Long ............................... 342/94 |
| 4,713,664 A | * | 12/1987 | Taylor, Jr. ....................... 342/91 |
| 4,766,435 A | * | 8/1988 | Wells ............................. 342/82 |
| 4,780,720 A | * | 10/1988 | Watts ............................. 342/91 |

(Continued)

*Primary Examiner* — Peter Bythrow  
(74) *Attorney, Agent, or Firm* — Frommer Lawrence & Haug LLP

(57) ABSTRACT

Sidelobe suppression methods and systems for use in processing radar video streams generated by rotational radar antenna scanners. The sidelobe suppression methods function in parallel with traditional Sensitivity Control (SC) processing by selectively reducing sensitivity where necessary depending on sidelobe suppression schemes that can be either directional, omni-directional (non-directional), or a combination of these.

37 Claims, 12 Drawing Sheets

(56) References Cited

U.S. PATENT DOCUMENTS

| | | | |
|---|---|---|---|
| 4,837,579 A * | 6/1989 | Pease et al. | 342/197 |
| 4,959,653 A * | 9/1990 | Ganz | 342/17 |
| 4,994,811 A * | 2/1991 | Moreira | 342/205 |
| 5,173,706 A * | 12/1992 | Urkowitz | 342/99 |
| 5,177,487 A * | 1/1993 | Taylor et al. | 342/159 |
| 5,280,289 A * | 1/1994 | Root | 342/91 |
| 5,311,184 A * | 5/1994 | Kuntman | 342/26 B |
| 5,327,141 A | 7/1994 | Sheldon | |
| 5,337,055 A * | 8/1994 | Ghignoni | 342/93 |
| 5,451,961 A * | 9/1995 | Rubin et al. | 342/159 |
| 5,546,084 A | 8/1996 | Hindman | |
| 5,686,919 A * | 11/1997 | Jordan et al. | 342/26 D |
| 6,087,977 A | 7/2000 | Rost | |
| 7,372,394 B1 | 5/2008 | Woodell et al. | |
| 7,796,082 B2 | 9/2010 | Wood | |
| 8,456,352 B2 * | 6/2013 | Wood | 342/205 |
| 2008/0191929 A1* | 8/2008 | Wood | 342/73 |
| 2009/0096662 A1* | 4/2009 | Wang et al. | 342/93 |
| 2009/0231195 A1 | 9/2009 | Chang et al. | |
| 2011/0291877 A1* | 12/2011 | Habboosh et al. | 342/159 |
| 2012/0154204 A1* | 6/2012 | Wood | 342/159 |

* cited by examiner

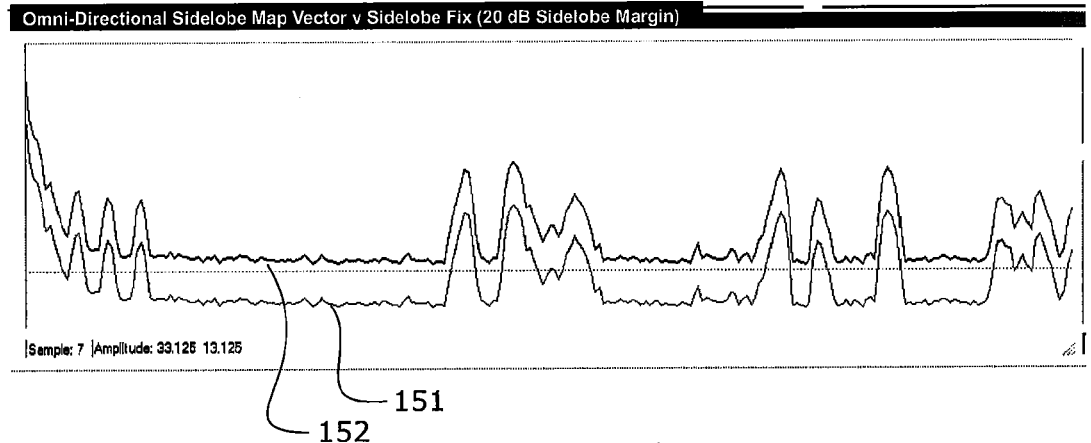
FIGURE 15
Automatic STC
Automatic STC with omni-directional sidelobe suppression
Raw radar video
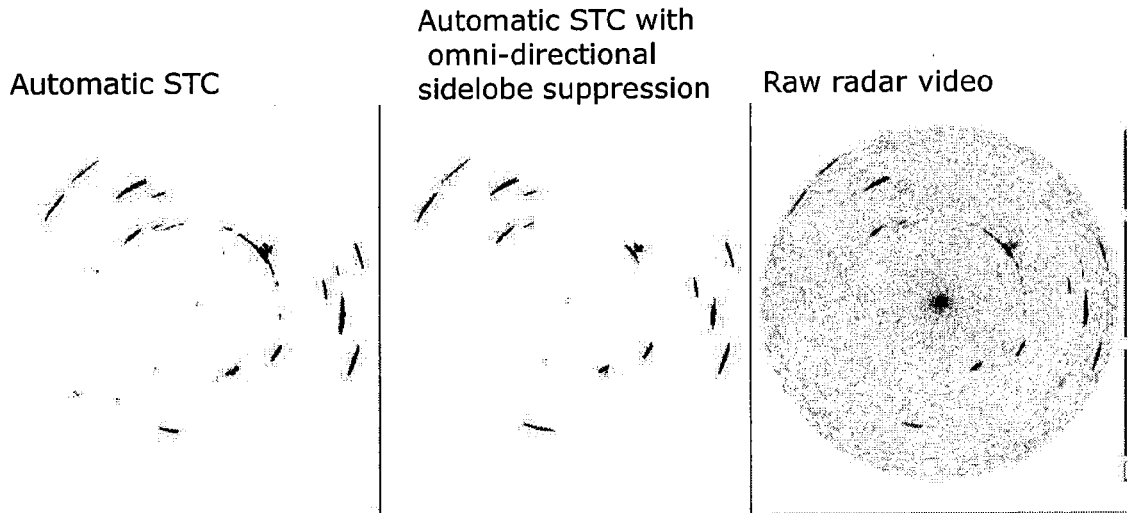
FIGURE 16A  FIGURE 16B  FIGURE 16C
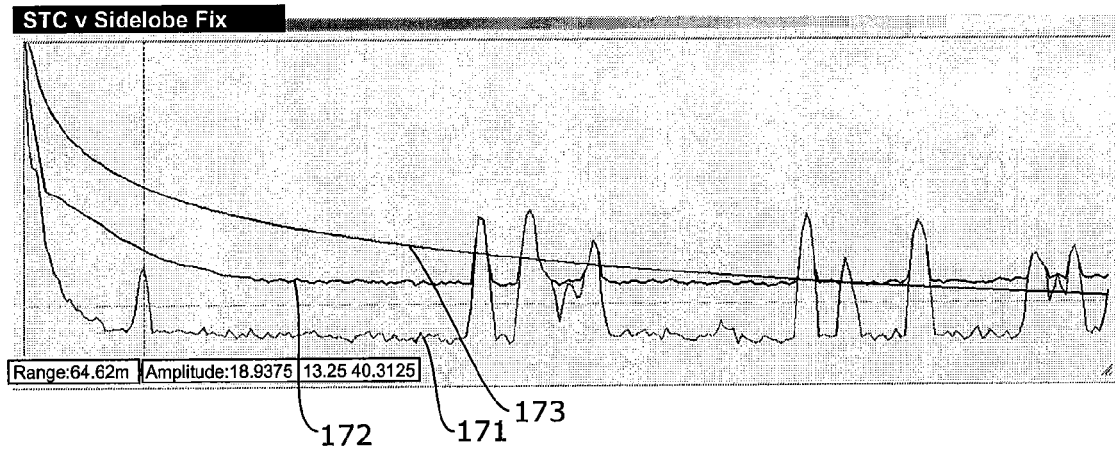
FIGURE 17

RADAR CLUTTER SUPPRESSION SYSTEM

This application is a division of U.S. patent application Ser. No. 13/474,289 mailed May 17, 2012 which claims priority benefits to U.S. Provisional Patent Application Ser. No. 61/487,048 filed May 17, 2011, the disclosures of which are all incorporated herein by reference.

FIELD OF THE INVENTION

The invention relates to a sidelobe clutter suppression system and method for radar systems. In particular, although not exclusively, the system is applied to marine radar systems.

BACKGROUND TO THE INVENTION

At a general level, marine radar systems typically comprise a rotating radar antenna scanner that transmits electromagnetic pulses during rotational 360° sweeps (scans) at a number of azimuthal directions in the sweep, the azimuthal sampling rate defined by the azimuthal resolution. For each pulse in an azimuthal direction the echo return signal is received and sampled at a number ranges from the scanner. The resultant digital radar video stream generated by the scanner is then typically signal processed to detect targets for presenting on a radar display, such as a Plan Position Indicator (PPI). The signal processing typically includes Sensitivity Time Control (STC) processing for detecting targets in the presence of clutter, such as echo returns caused by sea and rain clutter. STC typically provides a decaying echo return intensity threshold that is dependent on range. Echo returns in the digital radar video stream that exceed their corresponding STC threshold register as targets for display, while those below the threshold are characterized as clutter and ignored. In most modern marine radar systems, the STC threshold profile can be configured either manually or automatically, and can be customised based on developed models for the application or conditions based on various selectable input parameters including, but not limited to, such desired overall sensitivity (gain), rain state, and sea state.

Antenna sidelobe clutter is caused by echo returns from targets situated outside of the main beam or mainlobe of the antenna, but within a sidelobe beam zone of the antenna. In marine radar, sidelobe clutter exhibits as an arc of varying length centered around very large single targets and in the more detrimental case as regions of increased sidelobe clutter false alarms due to adjacent range and azimuth extensive target areas, such as land, built-up waterfront areas, bridges and the like. The occurrence of nuisance levels of sidelobe clutter is increased in small form factor radar systems due to lower azimuth sidelobe performance induced by the limited antenna horizontal size. At X-band marine frequencies, small form factor is generally taken to be antenna sizes of less than 600 mm and this includes the majority of all leisure marine radome scanner products. Also, larger antenna sizes of mainly open array types up to 1200 mm also suffer nuisance sidelobe clutter levels, but at a somewhat reduced level.

Sidelobe clutter is problematic for both manual and automatic STC as the sidelobe peaks are in fact true targets observed off the main beam due to the size of the source target. The current method of addressing such sidelobe clutter is to reduce sensitivity at all ranges and azimuths. This of course reduces the occurrence of sidelobe clutter, but at the expense of general sensitivity at ranges and bearings not affected by this type of clutter in the target scenario.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the invention to provide an improved system and method for sidelobe clutter suppression in radar, or to at least provide the public with a useful choice.

SUMMARY OF THE INVENTION

In a first aspect, the invention broadly consists in a method of suppressing sidelobe clutter for a radar signal processing system that receives a radar video stream from a radar antenna scanner and applies Sensitivity Control (SC) processing to the radar video stream based on a SC threshold profile that defines an echo return intensity threshold over range, comprising:
  determining estimates of the sidelobe clutter contribution levels (herein: sidelobe estimates) based on a buffer of the radar video stream and an antenna beam pattern response model of the radar antenna; and
  selectively modifying the SC threshold profile based on the determined estimates of the sidelobe clutter contribution levels.

In one embodiment, the method applies sensitivity control processing in the form of Sensitivity Time Control (STC) processing to the radar video stream based on an STC threshold profile. In another embodiment, the sensitivity control may be in the form of Sensitivity Frequency Control (SFC) based on an SFC threshold profile.

In one embodiment, the radar video stream represents the echo return intensities detected by the scanner during its 360° sweeps, sampled in azimuth and range. In one form the radar video stream may comprise a stream of azimuthal vector data, each azimuthal vector representing the echo return intensities at a number of range samples for that azimuthal direction in the sweep, and each azimuthal vector being processed one by one. The number of azimuthal directions in each sweep being referred to as the azimuthal resolution and the number of range samples for each direction being referred to as the range resolution.

In one embodiment, determining the sidelobe estimates comprises determining the sidelobe estimates for each new azimuthal vector in the radar video stream such that the sidelobe estimates are continuously updated. For example, each azimuthal vector may have corresponding sidelobe estimates, at each range sample.

In one embodiment, the sidelobe estimates for each azimuthal vector may be determined based on a buffer of the radar video stream centered about the azimuthal vector. For example, the buffer may comprise the azimuthal vectors within an azimuthal buffer range centered about the azimuthal vector. The azimuthal buffer range may represent a sector of the scanner sweep centered about the current azimuthal vector in the stream being processed.

In one embodiment, the azimuthal buffer range may be selected based on the antenna beam pattern performance. The azimuthal buffer range may be equivalent to the azimuthal range of the antenna beam pattern response model. For example, antennas with good sidelobe performance may have a smaller azimuthal buffer range than antennas with poorer sidelobe performance. By way of example, if the antenna is determined to have a beam pattern response with significant sidelobe responses over a range of 90° centered about the main beam, then the azimuthal buffer range may be selected to correspond to 90° also.

In one embodiment, the antenna beam pattern response model represents the antenna response level across the azimuthal buffer range, with the response levels being centered about the main beam. The antenna beam pattern response model may be an approximation of the response levels or measured levels. In one form, the response model may be in the form of a raised cosine centered about the main beam. In another form, the response model may be in the form of a triangle wave centered about the main beam. In yet another form, the response model may be in the form of a measured beam pattern response curve for the specific antenna of the radar antenna scanner.

In one embodiment, the sidelobe estimates for each azimuthal vector represent an estimate of the maximum sidelobe contribution level at each range sample. For example, the sidelobe estimates may be represented as a sidelobe contribution vector comprising estimates of the maximum sidelobe contribution levels at each range sample calculated based on the buffer of the radar video stream and the antenna beam pattern response model.

In one embodiment, each maximum sidelobe contribution level at each range in the sidelobe contribution vector is the maximum level selected from a generated set of individual candidate sidelobe levels at that respective range from cross range samples within the azimuthal buffer range. The set of individual candidate sidelobe levels for each range may represent the sidelobe contribution levels calculated for cross-range samples from each adjacent azimuthal vector in the azimuthal buffer range.

In one embodiment, the set of individual candidate sidelobe levels at each range is determined by applying the antenna beam pattern response model to the cross-range samples within the azimuthal buffer range. For example, each individual candidate sidelobe level from an azimuthal vector in the azimuthal buffer range is calculated by applying the range sample to the corresponding azimuthal response level of the antenna beam pattern response model. In one example, the range sample is multiplied by the response level to generate the individual candidate sidelobe level.

In one embodiment, the SC threshold profile comprises an echo return intensity threshold level for each range sample.

In one embodiment, selectively modifying the SC threshold profile based on the determined estimates of the sidelobe clutter contribution levels comprises: increasing the threshold levels of the SC threshold profile in range regions where the sidelobe estimates exceed the original threshold levels. For example, the threshold levels may be increased to a level substantially equal to or above their corresponding sidelobe estimates at the respective ranges. In one form, the method may comprise modifying the SC threshold profile when at least one or more sidelobe estimates exceed their corresponding threshold levels of the SC threshold profile at respective ranges. For example, the method may comprise increasing the threshold level of the SC threshold profile to a level substantially equal to or above the corresponding sidelobe estimate, at ranges where the original threshold levels are exceeded by their corresponding sidelobe estimate.

In one embodiment, the method comprises selectively modifying the SC threshold profile for each new azimuthal vector in the radar video stream prior to SC processing of that new azimuthal vector. For example, the method may comprise delaying the SC processing of new azimuthal vectors at least until their corresponding SC threshold profile has been selectively modified based on the determined sidelobe estimates.

In one embodiment, the SC threshold profile is selectively modified for each new azimuthal vector in the radar video stream based on sidelobe estimates determined from a buffer of the radar video stream that is centered about the new azimuthal vector.

In one embodiment, the original SC threshold profile is restored after each azimuthal vector has been SC processed such that the method comprises selectively modifying the original SC threshold profile based on the sidelobe estimates for each new azimuthal vector in the radar video stream.

In a second aspect, the invention broadly consists in a sidelobe clutter suppression system for a radar signal processing system that receives a radar video stream from a radar antenna scanner and applies Sensitivity Control (SC) processing to the radar video stream based on an SC threshold profile that defines an echo intensity threshold over range, comprising:
  a module configured to generate estimates of the sidelobe clutter contribution levels (herein: sidelobe estimates) based on a buffer of the radar video stream and an antenna beam pattern response model of the radar antenna; and
  a module configured to selectively modify the SC threshold profile based on the estimates of the sidelobe clutter contribution levels.

The second aspect of the invention may have any one or more features of the first aspect of the invention.

In a third aspect, the invention broadly consists in a method of suppressing sidelobe clutter for a radar signal processing system that receives a radar video stream from a radar antenna scanner and applies Sensitivity Control (SC) processing to the radar video stream based on an SC threshold profile that defines an echo return intensity threshold over range, comprising:
  determining the peak echo return intensity level (herein: peak return level) at each range based on a radar video stream representing a full scanner sweep; and
  selectively modifying the SC threshold profile based on the determined peak echo return intensity levels from the full scanner sweep.

In one embodiment, the radar video stream represents the echo return intensities detected by the scanner during its 360° sweeps, sampled in azimuth and range. In one form, the radar video stream may comprise a stream of azimuthal vector data, each azimuthal vector representing the echo return intensities at a number of range samples for that azimuthal direction in the sweep. By way of example, the SC processing is performed on each azimuthal vector one by one. The number of azimuthal directions in each sweep being referred to as the azimuthal resolution and the number of range samples for each direction being referred to as the range resolution.

In one embodiment, the peak return level for each range may be determined based on the maximum echo return intensity from all azimuthal vectors in the full sweep (i.e. full 1:1 resolution). In an alternative embodiment, the peak return level for each range may be determined based on the maximum echo return intensity from a sample of the azimuthal vectors in the full sweep (i.e. 1:N resolution, where N is an integer number). For example, a resolution of 1:2 is equivalent to determining the peak return level for each range over the full sweep based on every second azimuthal vector in the radar video stream.

In one embodiment, the determined peak return level at each range may be represented by a peak return level vector comprising the peak return levels at each range sample.

In one form, a peak return level vector is generated for each azimuthal vector in the radar video stream, and the SC threshold profile is selectively modified for each azimuthal vector based on the determined peak return level vector. In a first form, the peak return level vector may be determined for each azimuthal vector based on a buffer of the radar video stream comprising azimuthal vectors within an azimuthal buffer range of 360° centered about that azimuthal vector. In a second form, the peak return level vector may be determined for each azimuthal vector based on a buffer of the radar video stream comprising azimuthal vectors within an azimuthal buffer range of 360° occurring before that azimuthal vector. For example, the buffer may immediately precede the azimuthal vector in the video radar stream or may precede it by a predetermined range.

In another form, a peak return level vector may be generated once for each full sweep or, if segmented, for each segment of the sweep of radar video stream, and the SC threshold profile is selectively modified once for each full sweep or each segment based on the determined peak return level vector. In a first form, a peak return level vector may be determined once for each full sweep of azimuthal vectors based on a buffer of the radar video stream comprising azimuthal vectors within an azimuthal buffer range of 360° occurring before the sweep. By way of example, the peak return level vector for one sweep may be based on the azimuthal vectors from the previous sweep. In a second form, the sweep of azimuthal vectors may be segmented and a peak return level vector may be determined once for each segment based on a buffer of the radar video stream comprising azimuthal vectors within an azimuthal buffer range of 360° occurring before the segment.

In one embodiment, the method further comprises modifying the peak return level vector based on a selected antenna sidelobe margin factor to generate a modified peak return level vector comprising modified peak return levels for each range. By way of example, the sidelobe margin factor is selected based on the antenna characteristics. The antenna characteristics may for example include the antenna beam pattern response.

In one embodiment, the SC threshold profile comprises an echo return intensity threshold level for each range sample.

In one embodiment, the step of selectively modifying the SC threshold profile based on the determined peak echo return intensity levels from the full scanner sweep comprises: increasing the threshold levels of the SC threshold profile in range regions where the modified peak return levels exceed the original threshold levels. For example, the threshold levels may be increased to a level substantially equal to or above their corresponding modified peak return levels at the respective ranges. In one form, the method may comprise modifying the SC threshold profile when at least one or more modified peak return levels exceed their corresponding threshold levels of the SC threshold profile at respective ranges. By way of example, the method may comprise increasing the threshold level of the SC threshold profile to a level substantially equal to or above the corresponding modified peak return level, at ranges where the original threshold levels are exceeded by their corresponding modified peak return level.

In one embodiment, the method may comprise selectively modifying the SC threshold profile for each new azimuthal vector in the radar video stream prior to SC processing of that new azimuthal vector. By way of example, the method may comprise delaying the SC processing of new azimuthal vectors at least until their corresponding SC threshold profile has been selectively modified based on the determined modified peak return level vector.

In one embodiment, the original SC threshold profile is restored after each azimuthal vector has been SC processed or prior to each step of selectively modifying the SC threshold profile.

In a fourth aspect, the invention broadly consists in a sidelobe clutter suppression system for a radar signal processing system that receives a radar video stream from a radar antenna scanner and applies Sensitivity Control (SC) processing to the radar video stream based on an SC threshold profile that defines an echo intensity threshold over range, comprising:
  a module configured to determine the peak echo return intensity level (herein: peak return level) at each range based on radar video stream representing a full scanner sweep; and
  a module configured to selectively modify the SC threshold profile based on the determined peak echo return intensity levels from the full scanner sweep.

The fourth aspect of the invention may have any one or more features of the third aspect of the invention.

In a fifth aspect, the invention broadly consists in a method of suppressing sidelobe clutter for a radar signal processing system that receives a radar video stream from a radar antenna scanner and applies Sensitivity Control (SC) processing to the radar video stream based on an SC threshold profile that defines an echo return intensity threshold over range, comprising:
  determining estimates of the sidelobe clutter contribution levels (herein: sidelobe estimates) based on a buffer of the radar video stream and an antenna beam pattern response model of the radar antenna;
  determining the peak echo return intensity level (herein: peak return level) at each range based on a radar video stream representing a full scanner sweep; and
  selectively modifying the SC threshold profile based on the determined estimates of the sidelobe clutter contribution levels and/or the determined peak echo return intensity levels from the full scanner sweep.

In a sixth aspect, the invention broadly consists in a sidelobe clutter suppression system for a radar signal processing system that receives a radar video stream from a radar antenna scanner and applies Sensitivity Control (SC) processing to the radar video stream based on an SC threshold profile that defines an echo intensity threshold over range, comprising:
  a module configured to determine estimates of the sidelobe clutter contribution levels (herein: sidelobe estimates) based on a buffer of the radar video stream and an antenna beam pattern response model of the radar antenna;
  a module configured to determine the peak echo return intensity level (herein: peak return level) at each range based on radar video stream representing a full scanner sweep; and
  a module configured to selectively modify the SC threshold profile based on the determined estimates of the sidelobe clutter contribution levels and/or the determined peak echo return intensity levels from the full scanner sweep.

The fifth and sixth aspects of the invention may have any one or more features mentioned in respect of the first-fourth aspects of the invention above.

In a seventh aspect, the invention broadly consists in a method of controlling sidelobe clutter suppression in a radar signal processing system that receives and processes a radar video stream from a radar antenna scanner comprising:

providing a sidelobe suppression system that is operable to apply a level of sidelobe suppression to the processing of the radar video stream; and providing a user sidelobe suppression level control that is configurable or operable by a user to modify the level of sidelobe suppression applied by the sidelobe suppression system.

In one embodiment, the radar signal processing system applies Sensitivity Control (SC) processing to the radar video stream based on an SC threshold profile that defines an echo intensity threshold over range, and the sidelobe clutter suppression system applies sidelobe suppression to the SC threshold profile to reduce sidelobe clutter based on processing of the radar video stream.

In an eighth aspect, the invention broadly consists in a sidelobe clutter suppression system for a radar signal processing system that receives and processes a radar video stream from a radar antenna scanner, comprising:

a sidelobe suppression system that is configured to apply a level of sidelobe suppression to the processing of the radar video stream; and a user sidelobe suppression level control that is configurable or operable by a user to modify the level of sidelobe suppression applied by the sidelobe suppression system.

In one embodiment, the radar signal processing system is configured to apply Sensitivity Control (SC) processing to the radar video stream based on an SC threshold profile that defines an echo intensity threshold over range, and the sidelobe suppression system is configured to apply sidelobe suppression to the SC threshold profile to reduce sidelobe clutter based on processing of the radar video stream.

The seventh and eight aspects of the invention may have any one or more of the features mentioned in respect of the first-sixth aspects of the invention above.

The phrase "Sensitivity Control" or "SC" as used in this specification and claims, unless the context suggests otherwise, is intended to mean any sensitivity, sensitivity threshold, or radar receiver response adjustment processing that is dependent on the range of the echo return signal, whether range is determined, directly or indirectly, in the time domain, frequency domain or equivalent, and including but not limited to traditional approaches such as Sensitivity Time Control (STC) in the time domain which varies sensitivity according to the time the echo return signal was received such as in pulse radar where time is proportional to distance, or Sensitivity Frequency Control (SFC) in which sensitivity is varied in the frequency domain based on the frequency of the echo return signal such as in Frequency Modulated Continuous Wave (FMCW) radar where frequency is proportional to distance, or any other equivalent sensitivity adjustment scheme or processing that is dependent on the range of the echo return signal.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Embodiments of the invention will be described by way of example only and with reference to the drawings, in which:

FIG. 15 is a plot of the omni-directional sidelobe map vector and the sidelobe fix vector for a 20 dB margin in experiment 2;

FIG. 16A is a plot of the target detection map for an automatic STC scheme applied to the radar scene of FIG. 13 without omni-directional sidelobe suppression applied, with the main sidelobe clutter in the scenario due to the large vessel (circa 36 dBm² RCS) at approximately 290 m;

FIG. 16B is a plot of the target detection map for an automatic STC scheme applied to the radar scene of FIG. 13 with omni-directional sidelobe suppression applied predicatively;

FIG. 16C is a plot of pre-target detection radar video for FIG. 13; and

FIG. 17 is a plot of the omni-directional sidelobe fix compared with the fully directional STC applied to the simple target scenario of FIG. 13.

DETAILED DESCRIPTION OF PREFERRED EMBODIMENTS

1. Overview

The invention relates to sidelobe suppression methods and systems for use in processing radar video streams generated by rotational radar antenna scanners, such as in marine radar systems for example, although not exclusively. The methods and systems may be applied to any radar systems, and particularly small form factor radar systems.

The sidelobe suppression methods function in parallel with traditional Sensitivity Control (SC) processing by selectively reducing sensitivity where necessary depending on sidelobe suppression schemes that can be either directional, omnidirectional (non-directional), or a combination of these. The sidelobe suppression methods may operate automatically or alternatively may be controlled manually via user input. A matching delay is applied to the standard radar video path such that the sidelobe suppression processing delay is compensated for when combining the sidelobe suppression with the traditional SC processing of the radar video stream.

The following embodiments of the sidelobe suppression methods and systems employ sensitivity control in the form of traditional Sensitivity Time Control (STC) processing of the radar video stream. However, it will be appreciated that any other sensitivity control processing in which the sensitivity to target detection is dependent on the range of the echo return signal may be used, including whether the range of the echo return signal is determined in the time domain, frequency domain, or any equivalent, and including by way of example Sensitivity Frequency Control (SFC) in the context of frequency modulated continuous wave (FMCW) radar.

In the following description, specific details are given to provide a thorough understanding of the embodiments. However, it will be appreciated that the embodiments may be practiced without these specific details. For example, software modules, functions, circuits, and the like, may be shown in block diagrams so as to avoid obscuring the embodiments in unnecessary detail. In other instances, well-known modules, structures and techniques may not be shown in detail so as to avoid obscuring the embodiments.

The methods and systems may be implemented in hardware, software, firmware, middleware, microcode, or a combination of these. The systems may be implemented on any hardware architecture or electronic system having a programmable processor and memory for carrying out the various data and signal processing, including systems having a computer processor, digital signal processor, microcontroller, or any other programmable device.

2. Directional Sidelobe Suppression Method and System

Figure 1:
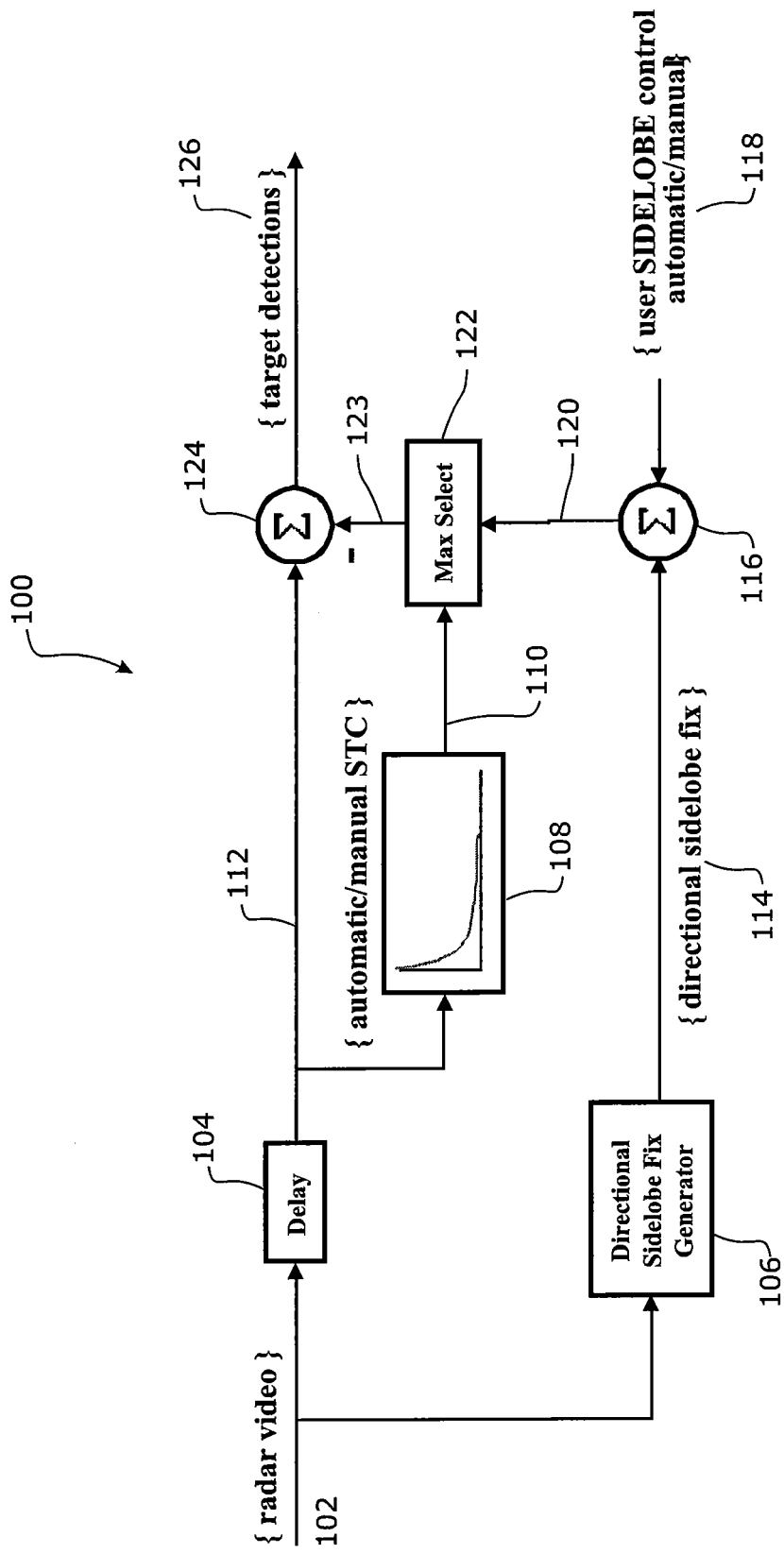
FIG. 1 is a schematic block diagram of a directional sidelobe clutter suppression system in accordance with an embodiment of the invention.
Figure 2:
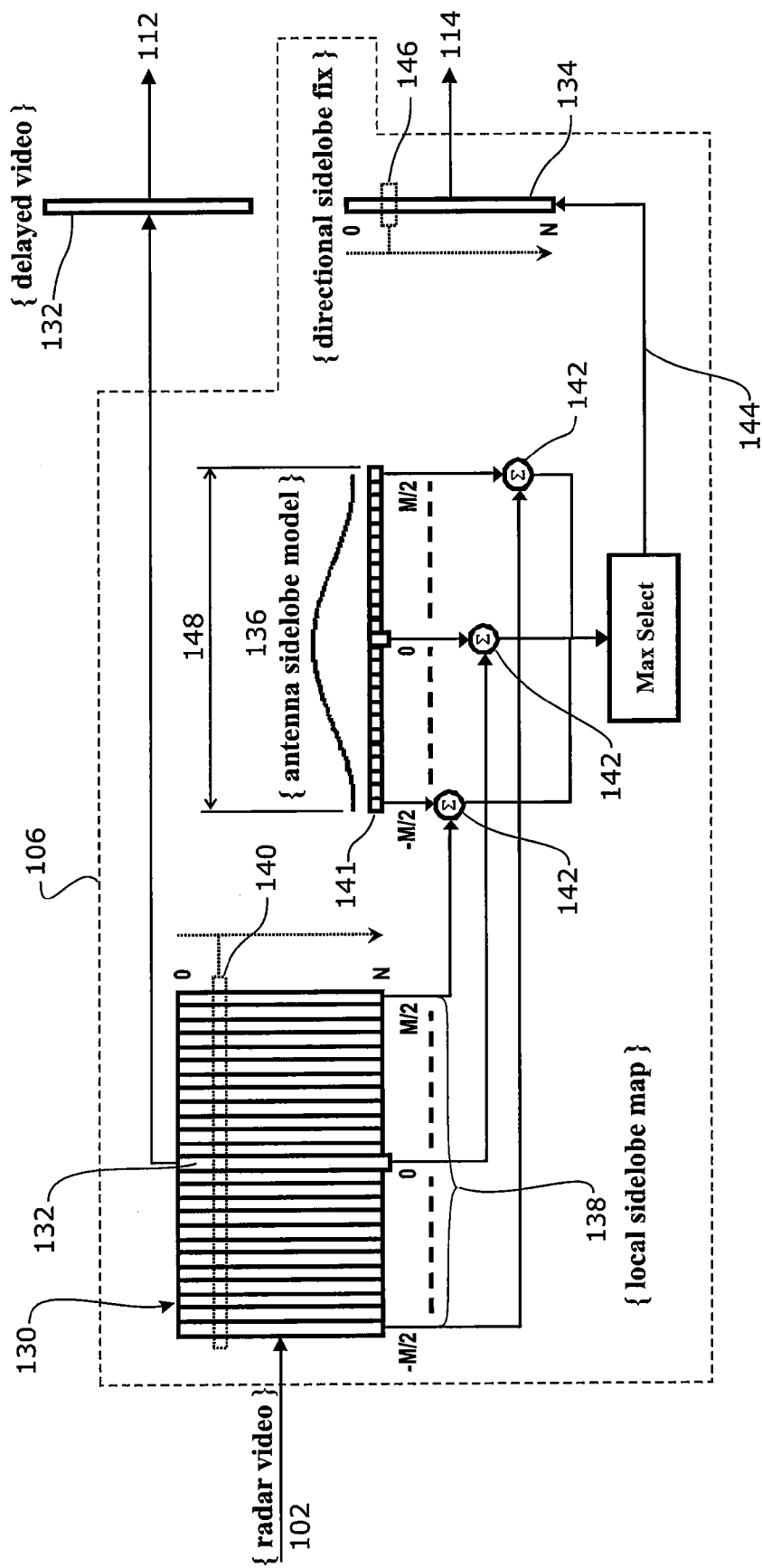
FIG. 2 is a schematic block diagram of the directional sidelobe fix generator module of FIG. 1 for determining estimates of sidelobe clutter contribution levels in accordance with an embodiment of the invention.

Referring to FIGS. 1 and 2, an example implementation of the directional sidelobe suppression method and system 100 will now be explained in further detail. FIG. 1 shows a portion of the radar signal processing of a marine radar system which processes a radar video stream 102 from a rotating radar antenna scanner for converting into a radar display, such as a Plan Position Indicator (PPI) or similar. It will be appreciated that various other signal processing functions are carried out in such radar signal processing systems, but these are not shown for clarity.

The radar video stream 102 is in the form of a stream of vector arrays, each vector array representing the echo return intensities sampled over a number of range samples for an azimuthal direction of the scanner 360° sweep. The radar video stream in this embodiment is provided in a logarithmic form. The number of azimuthal vector arrays for each scanner sweep is determined by the azimuthal resolution of the scanner, and the number of range samples is determined by the range resolution. In this embodiment, the system operates using logarithmic data and operators, although this is not essential.

In brief, the directional sidelobe suppression method operates by creating a directional sidelobe fix vector (sidelobe contribution vector) by processing a stored sector of the radar video stream (local sidelobe map) with a representative model of the radar antenna beam pattern. A directional sidelobe fix vector is generated for each new azimuthal vector in the radar video stream and is applied to selectively modify the sensitivity of the STC threshold intensities for the subsequent processing of that azimuthal vector of the radar video stream to compensate for sidelobe clutter.

The radar video stream 102 is sent both to a delay module 104 and a directional sidelobe fix generator 106. The delay module 104 operates to delay the radar video stream to compensate for delay in the processing of the directional sidelobe fix generator 106, and outputs a delayed radar video stream 112. The signal processing includes a traditional STC module 108 that is configured to generate a threshold profile comprising an echo return intensity threshold level for each range sample, and this may be represented as an STC vector array 110. The STC vector array may be configured manually by a user or generated automatically by the STC module 108 without user input and/or in response to parameters or settings provided by the user as is known to a skilled person.

The directional sidelobe fix generator 106 is configured to generate a directional sidelobe fix vector 114 representing estimates of the maximum sidelobe clutter contribution levels at each range sample for each new azimuthal vector in the radar video stream. The directional sidelobe fix vector 114 is also in the form of a vector array comprising a maximum sidelobe clutter contribution level for each range sample. A new directional sidelobe fix vector 114 is generated for each new incoming azimuthal vector of the radar video stream.

The suppression system includes an optional configurable user input control level 118 that may be modified automatically by the radar processing system or alternatively manually controlled by the user. By way of example, the input control level 118 may vary between a range of 0-100% of application of the sidelobe suppression scheme, such that the level may scale the directional sidelobe fix vector 114 to zero, partial or full application to the STC processing of the radar video stream. As shown, the suppression system comprises a modifier 116 that modifies the directional sidelobe fix vector 114 based on the user input control level 118 to generate a modified directional sidelobe fix vector 120.

The directional sidelobe fix vector works in conjunction with the STC vector in that the dominant level between STC and sidelobe fix is used as the operational sensitivity at that range and direction. Hence the basic application of the directional sidelobe fix envelope is a maximum select operator at module 122 between sidelobe fix and STC prior to subtraction at modifier 124 from the (logarithmic) radar video to produce the expected target detections 126. As previously mentioned, the delay module 104 is used to synchronise the radar video stream with the output of the directional sidelobe fix generator 106.

Referring to FIG. 2, the directional sidelobe fix generator 106 will be explained in more detail. For each new azimuthal vector in the radar video stream, the directional sidelobe fix generator 106 is configured to generate and output a corresponding directional sidelobe fix vector at 114. In this example, the new azimuthal vector in the radar video stream is represented by the bar at 132 and its corresponding generated directional sidelobe fix vector is shown at 134.

The sidelobe estimates in the directional sidelobe fix vector 134 are determined based on a buffer 130 of the radar video stream 102 centered about the azimuthal vector 132 being processed and an antenna beam pattern response model 136. By way of example, the buffer 130 may comprise the azimuthal vectors within an azimuthal buffer range 138 centered about the azimuthal vector. The azimuthal buffer range effectively represents a sector of the scanner sweep centered about the current azimuthal vector in the stream being processed.

The directional sidelobe fix generator 106 generates the directional sidelobe fix vector 134 for each range sample 0 . . . N by inspecting the symmetrically adjacent cross-range samples extending −M/2 . . . +M/2 samples centered around the current range sample of azimuthal vector 132 to identify which adjacent target echo will contribute the highest sidelobe clutter level to the current sample. The sidelobe estimates in the directional sidelobe fix vector represent an estimate of the maximum sidelobe contribution level at each range sample calculated based on the buffer 130 of the radar video stream and the antenna beam pattern response model 136. Each maximum sidelobe contribution level at each range in the directional sidelobe fix vector 134 is the maximum level selected from a set of individual candidate sidelobe levels at that respective range from cross range samples within the azimuthal buffer range. The set of individual candidate sidelobe levels for each range represents the sidelobe contribution levels calculated for cross-range samples from each adjacent azimuthal vector in the azimuthal buffer range 138.

In this example, the set of individual candidate sidelobe levels at each range (0 . . . N) is determined by applying the antenna beam pattern response model 136 to the cross-range samples within the azimuthal buffer range 138. This is systematically done for each row of cross-range samples (0 . . . N) in the buffer 130, to progressively form the directional sidelobe fix vector 134. For example for the cross range sample shown at 140, each of the range samples in that row of the buffer 130 are subject to a logarithmic summation 142 with their corresponding azimuthal response level 141 of the antenna beam pattern response model 136. It will be appreciated that the logarithmic summation is equivalent to magnitude multiplication of the intensity levels. A maximum select operator 144 receives all the calculated individual candidate sidelobe levels from the summation operators 142 and selects the maximum sidelobe level 144 for inserting into the directional sidelobe fix vector 134 at the corresponding range position 146 corresponding to the cross range sample shown at 140. This process is repeated for all rows (0 . . . N) in the buffer 130 until the directional sidelobe fix vector 134 is fully formed. It will be appreciated that other convolution methods could be used alternatively to determine the dominant sidelobe level relative to the current azimuthal direction.

The azimuthal buffer range 138 may be selected based on the antenna beam pattern performance. For example, the azimuthal buffer range 138 may be equivalent to the azimuthal range 148 of the antenna beam pattern response model.

The antenna beam pattern response model 136 represents the antenna response level across the azimuthal buffer range, with the response levels being centered about the main beam. The antenna beam pattern response model may be an approximation of the response levels or measured levels. In one form, the response model 136 may be in the form of a raised cosine centered about the main beam as shown in FIG. 2. In another form, the response model may be in the form of a triangle wave centered about the main beam. In yet another form, the response model may be in the form of a measured beam pattern response curve for the specific antenna of the radar antenna scanner.

Reverting to FIG. 1, the application of the generated sidelobe fix vector 114 to the STC vector will be described further. The STC vector 110 comprises an array of echo return intensity threshold levels for each range sample. As previously mentioned, each delayed azimuthal vector 112 in the radar video stream has a corresponding directional sidelobe fix vector 114 generated by generator 106, which may or may not be modified by an optional user control level input 118. In operation, the system is configured to compare the STC vector 110 and user modified directional sidelobe fix vector 120 at each corresponding range sample, and is provided with a maximum select operator 122 for selecting the greater level from the two vectors for forming a modified STC vector at 123, which is then applied to the delayed corresponding azimuthal vector 112 at subtraction operator 124 to generate the target detections 126 for that azimuthal direction for subsequent radar display. It will be appreciated that the above process is repeated for each new azimuthal vector in the radar video stream. With this process, the directional sidelobe fix vector is selectively modifying the sensitivity of the STC profile to reduce sidelobe clutter.

3. Omni-Directional Sidelobe Suppression Method and System

Figure 3:
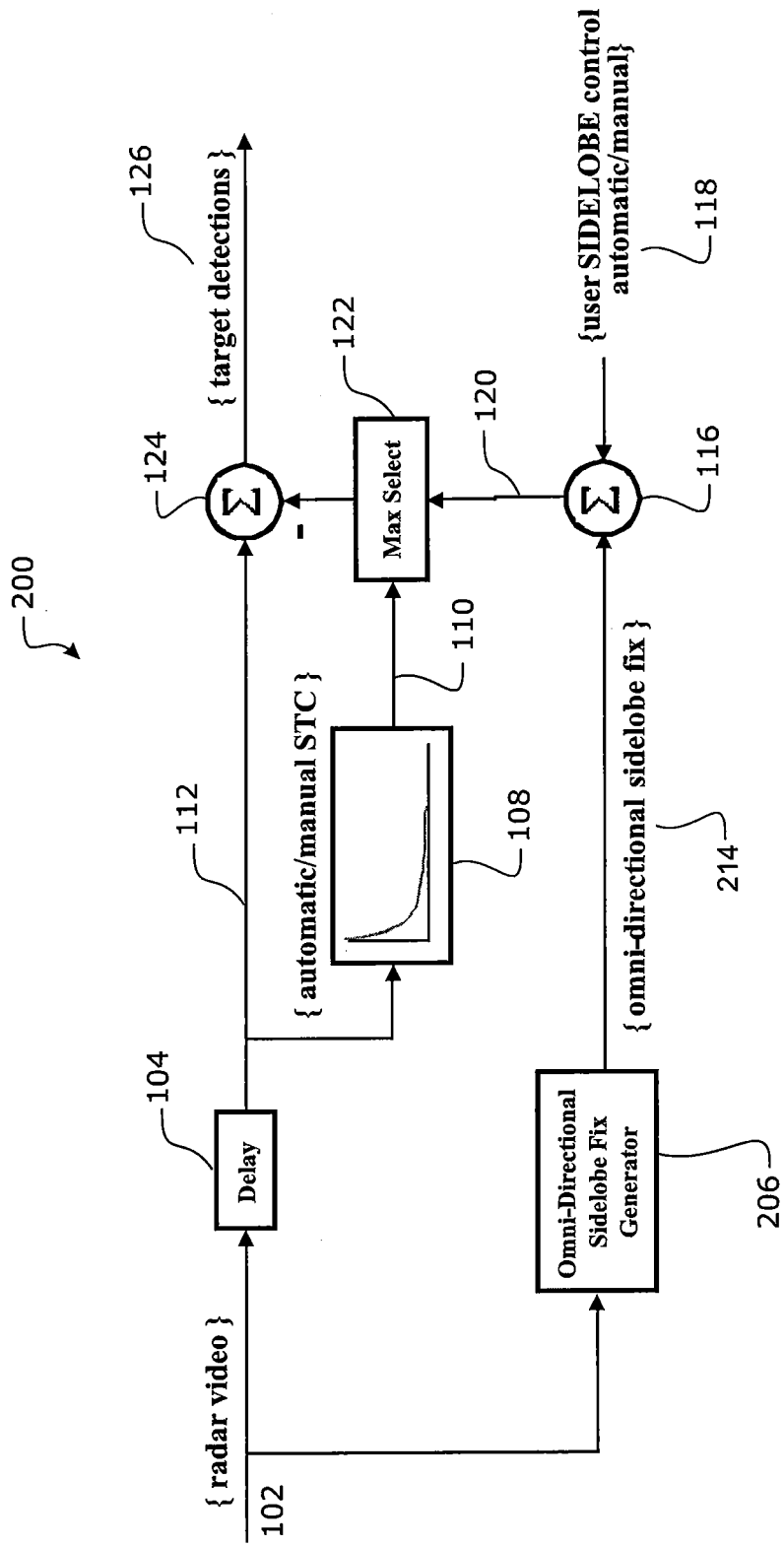
FIG. 3 is a schematic block diagram of an omni-directional sidelobe clutter suppression system in accordance with an embodiment of the invention.
Figure 4:
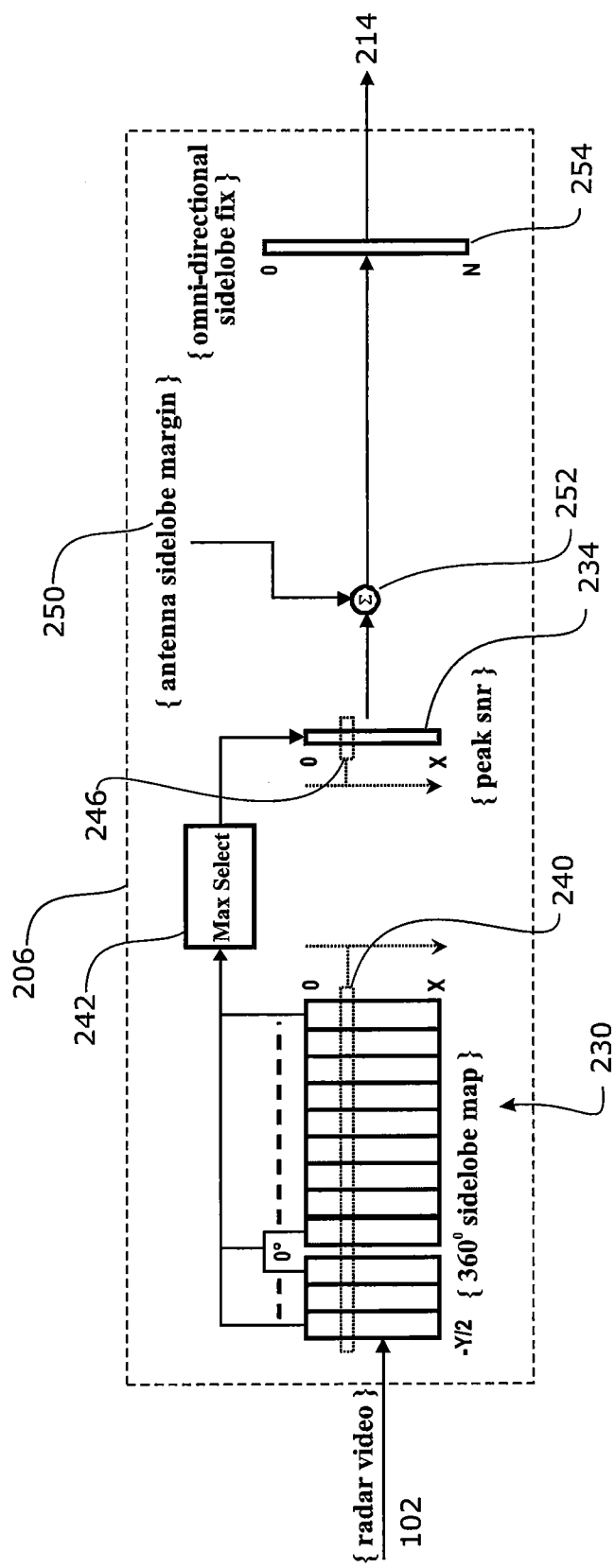
FIG. 4 is a schematic block diagram of the omni-directional sidelobe fix generator module of FIG. 3 for determining the peak echo return intensity level at each range based on radar video stream representing a full scanner sweep.

Referring to FIGS. 3 and 4, an example implementation of the omni-directional sidelobe suppression method and system 200 will now be explained in further detail. FIG. 3 shows a portion of the radar signal processing of a marine radar system similar to that previously described with reference to FIG. 1, and like components have like reference numerals. The primary difference is that in FIG. 3, there is an omni-directional sidelobe fix generator 206 instead of the directional sidelobe fix generator 106. Otherwise, the system operates in a similar manner and uses logarithmic data and operators as before, although this is not essential.

In brief, the omni-directional sidelobe suppression method creates an omni-directional sidelobe fix vector by applying a representative antenna sidelobe margin to the peak echo return intensity levels (peak SNR detections) at each range from a delayed full 360° sweep (360° sidelobe map) of the radar video stream. An omni-directional sidelobe fix vector 214 may be generated for each new azimuthal vector in the radar video stream for real-time processing or may be predicted such that it is determined once for each new full sweep of the azimuthal vectors or a segment of the azimuthal vectors based on a delayed full 360° sweep of the radar video stream. Once determined, the omni-directional sidelobe fix vector 214 may be applied to selectively modify the sensitivity of the STC threshold intensities of the STC vector 110 for the subsequent processing of each new azimuthal vector or a full sweep or segment of azimuthal vectors of the radar video stream to compensate for sidelobe clutter.

Referring to FIG. 4, the omni-directional sidelobe fix generator 206 will be explained in more detail. The omni-directional sidelobe fix generator 306 receives the radar video stream 102 and maintains a buffer of that data for a full 360° sweep (360° sidelobe map). The buffer 230 may contain all azimuthal vectors from the sweep, such that it is a full resolution map of 1:1, or may alternatively contain a sample of the azimuthal vectors from the sweep such that it as a lower resolution of 1:N. For example, at a resolution of 1:2, every second azimuthal vector of the radar video stream is stored in the buffer 230. For lower resolutions less than 1:1, the system may additionally comprise an accumulation method to protect against the loss of significant data. By way of example, such an accumulation method may perform peak detecting of the discarded samples with the retained samples in the same spatial region such that the target peak returns are not omitted from the peak return level vector.

In operation, the omni-directional sidelobe fix generator 206 is configured to generate a peak return level vector 234 based on the data in the buffer 230. The peak return level vector 234 comprises a vector array containing the peak SNR data for each range sample (0 ... X), selected from the 360° range swath in the buffer 230. By way of example, at range sample 240, the row of corresponding row samples across the 360° sidelobe map 230 is processed by a maximum selection operator 242 which outputs the range sample of the range swath representing the peak SNR into the corresponding range sample position 246 in the peak return level vector 234. This process is repeated for the remaining rows (range swaths) of the 360° sidelobe map to progressively fill out the peak return level vector 234.

In one configuration of the omni-directional sidelobe fix generator 206, a peak return level vector 234 is determined for each azimuthal vector in the radar video stream, and the STC threshold profile is selectively modified for each azimuthal vector based on the determined peak return level vector. This means that the peak return level vector 234 is updated in real-time with the STC processing of each new azimuthal vector in the radar video stream. In a first form, the peak return level vector 234 may be determined for each azimuthal vector based on a buffer of the radar video stream comprising azimuthal vectors within an azimuthal buffer range of 360° centered about that azimuthal vector. In a second form, the peak return level vector 234 may be determined for each azimuthal vector based on a buffer of the radar video stream comprising azimuthal vectors within an azimuthal buffer range of 360° occurring before that azimuthal vector. For example, the buffer may immediately precede the azimuthal vector in the video radar stream or may precede it by a predetermined range.

In another configuration of the omni-directional sidelobe fix generator 206, a peak return level vector may be determined once for each full sweep or, if segmented, for each segment of the sweep of radar video stream, and the STC threshold profile is selectively modified once for each full sweep or each segment based on the determined peak return level vector. This means that the peak return level vector 234 is predicted for the STC processing of the next sweep or segment of azimuthal vectors of the radar video stream. In a first form, a peak return level vector may be determined once for each full sweep of azimuthal vectors based on a buffer of the radar video stream comprising azimuthal vectors within an azimuthal buffer range of 360° occurring before the sweep. By way of example, the peak return level vector for one sweep may be based on the azimuthal vectors from the previous sweep. In a second form, the sweep of azimuthal vectors may be segmented and a peak return level vector may be determined once for each segment based on a buffer of the radar video stream comprising azimuthal vectors within an azimuthal buffer range of 360° occurring before the segment.

After each peak return level vector 234 has been generated, the generator 206 is configured to modify the peak return level vector 234 by a configurable antenna sidelobe margin factor 250 as shown at summation operator 252 to generate a modified peak return level vector 254 (omni-directional sidelobe fix vector) for output 214. Typically, the antenna sidelobe margin factor 250 is configured or selected based on the antenna characteristics, such as the antenna beam pattern response.

Reverting to FIG. 3, the application of the generated omni-directional sidelobe fix vector 214 to the STC vector will be described further. The STC vector 110 comprises an array of echo return intensity threshold levels for each range sample. As previously mentioned, each delayed azimuthal vector 112 in the radar video stream has a corresponding omni-directional sidelobe fix vector 214 generated by generator 106, which may or may not be modified by an optional user control level input 118. In operation, the system is configured to compare the STC vector 110 and user modified directional sidelobe fix vector 120 at each corresponding range sample, and is provided with a maximum select operator 122 for selecting the greater level from the two vectors for forming a modified STC vector at 123, which is then applied to the delayed corresponding azimuthal vector 112 at subtraction operator 124 to generate the target detections 126 for that azimuthal direction for subsequent radar display. It will be appreciated that the above process is repeated for each new azimuthal vector in the radar video stream. With this process, the omni-directional sidelobe fix vector is selectively modifying the sensitivity of the STC profile to reduce sidelobe clutter.

4. Combination System

Figure 5:
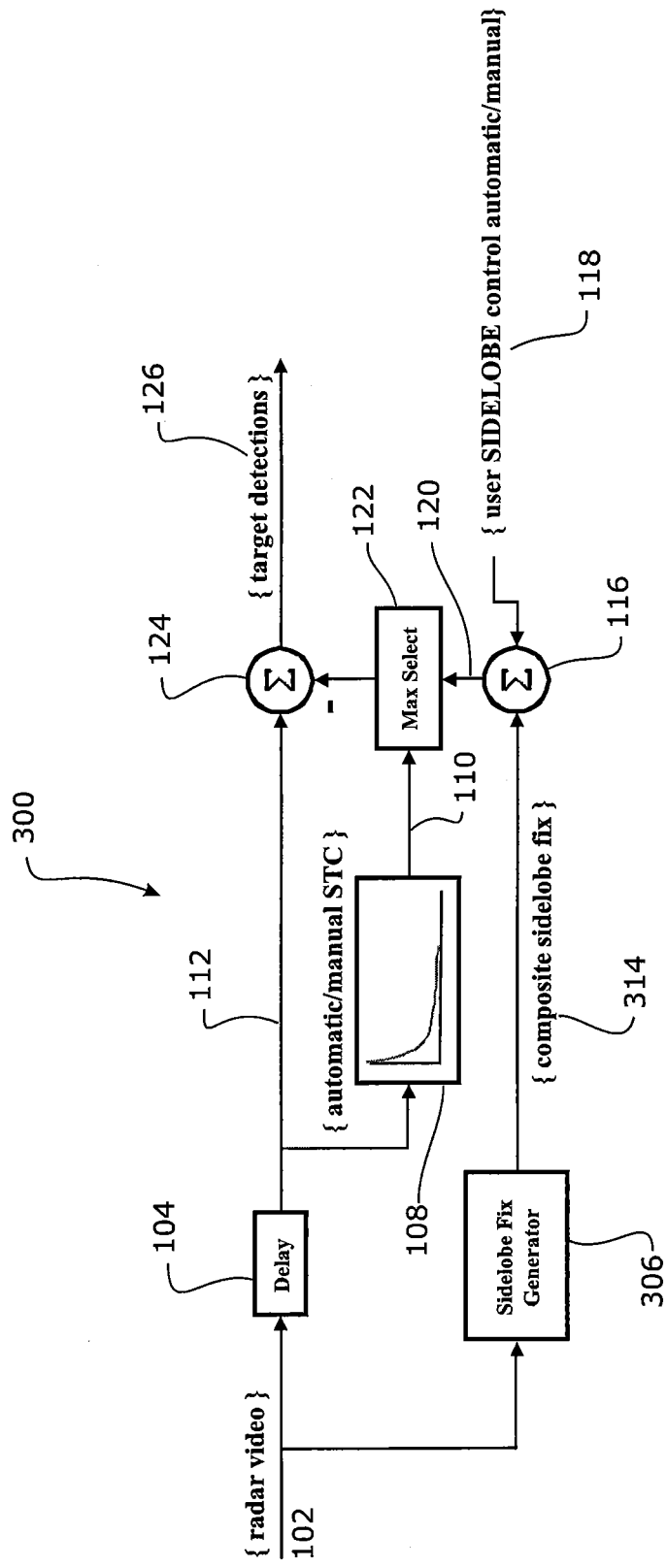
FIG. 5 is a schematic block diagram representing a composite sidelobe clutter suppression system comprising both the directional and omni-directional sidelobe suppression systems of FIGS. 1 and 3 respectively.
Figure 6:
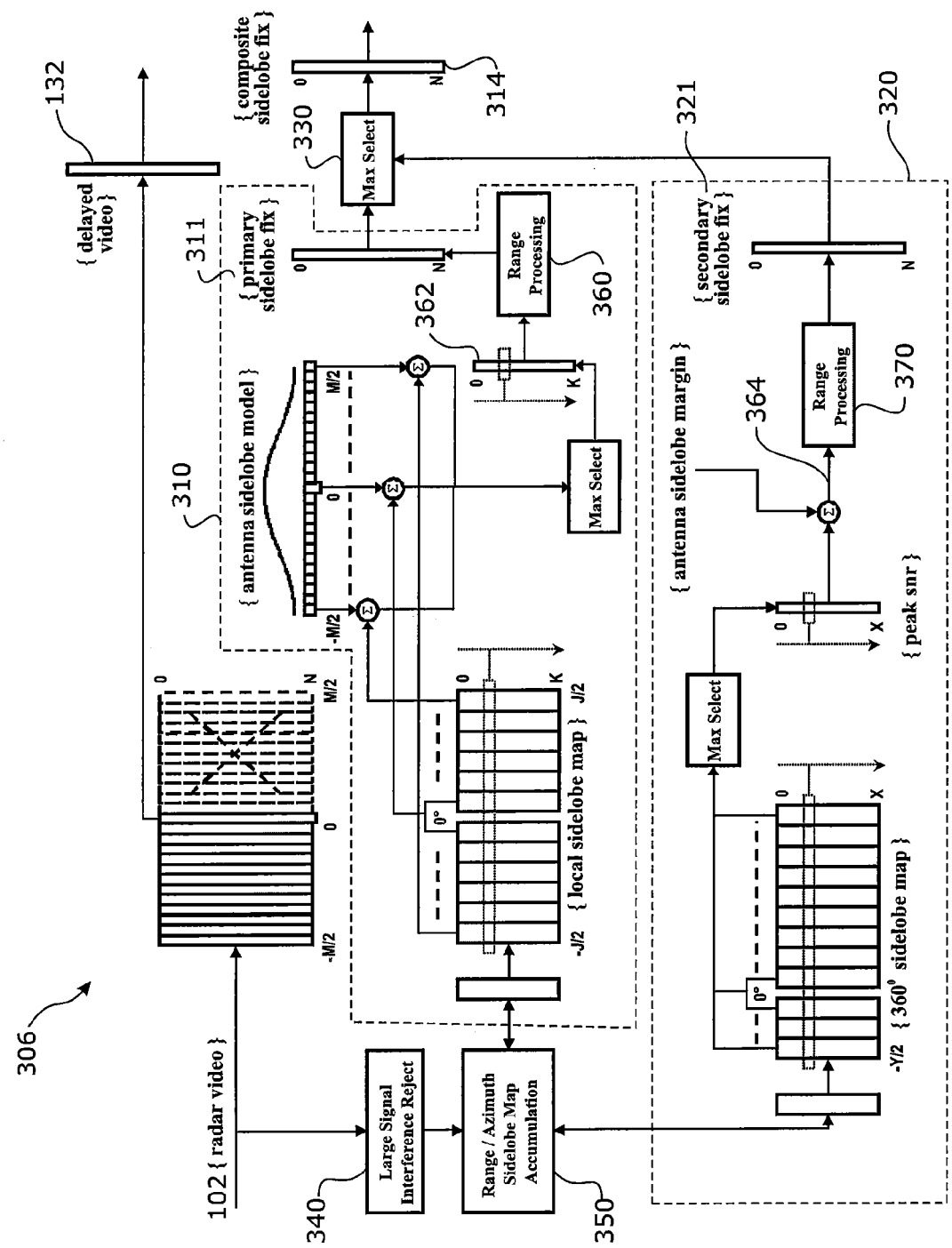
FIG. 6 is a schematic block diagram of the sidelobe fix generator module of FIG. 5 in accordance with an embodiment of the invention.

Referring to FIGS. 5 and 6 a schematic block diagram representing a composite sidelobe clutter suppression system 300 comprising both directional and omni-directional sidelobe suppression sub-systems similar to those of FIGS. 1 and 3 will be described.

Referring to FIG. 5, the configuration of the radar processing is the same as before, and like components have like reference numerals. The primary difference is that there is a composite sidelobe fix generator 306 generating a composite sidelobe fix vector 314 that derived from both a directional and omni-directional sub-systems.

Referring to FIG. 6, the composite sidelobe fix generator 306 will be described. The generator 306 comprises a directional sidelobe fix generator 310 which operates in a similar manner to that previously described with reference to FIGS. 1 and 2, and generates a directional sidelobe fix vector 311 (primary sidelobe fix vector). The generator 306 also comprises an omni-directional sidelobe fix generator 320 which operates in a similar manner to that previously described with reference to FIGS. 3 and 4, and generates an omni-directional sidelobe fix vector 321 (secondary sidelobe fix vector).

The sidelobe fix generator 306 is configured to process the primary sidelobe fix vector 311 and secondary sidelobe fix vector 321 to generate a composite sidelobe fix vector 314 that represents the output of the generator 306 and which is used to selectively modify the sensitivity of STC profile for STC processing of the radar video stream to reduce sidelobe clutter. In this embodiment, the primary 311 and secondary 321 sidelobe vectors are processed by a maximum select operator 330 that is configured to compare the vectors at each range sample and select the maximum for inserting into the corresponding range sample in the composite sidelobe fix vector.

Reverting to FIG. 5, the composite sidelobe fix vector 314 is processed in a similar manner to that described with respect to the directional and omni-directional sidelobe fix vectors to thereby selectively modify the STC vector 110 of the STC processing to compensate the sensitivity for sidelobe clutter.

As shown in FIG. 6, the composite system may also include one or more additional front-end and back-end processing modules to enhance performance in certain applications. These additional processing modules will now be described with reference to the composite system, but it will be appreciated that any one or more of these modules may also be incorporated into either of the directional or omni-directional sidelobe suppression systems of FIGS. 1-4 in their own right.

Interference Suppression Method

A large signal interference reject module 340 may be provided to prevent or reduce incorrect higher levels of sidelobe fix compensation due to intermittent interference spikes in the radar video stream from external sources that may be present during use of the system.

Spatial Resolution Reduction Method

A range/azimuth sidelobe map accumulation module 350 may be applied in a number of different configurations to match the required physical processing and storage resources of the composite system to those available in a specific system implementation. Spatial resolution reduction may not be required.

Range Processing

Range processing modules 360 and 370 may be applied to the raw sidelobe fix vectors 362 and 364 respectively of the directional and omni-directional sub-systems. The range processing may include any one or more of the following operations: (i) resampling to recover full range precision if spatial resolution reduction has been applied; (ii) target relative velocity (range walk) protection; and (iii) level adjustment compensation for target fading effects that are a characteristic of radar detection methods.

5. Experimental Results

Directional Sidelobe Suppression

Experiment 1

Figure 7:
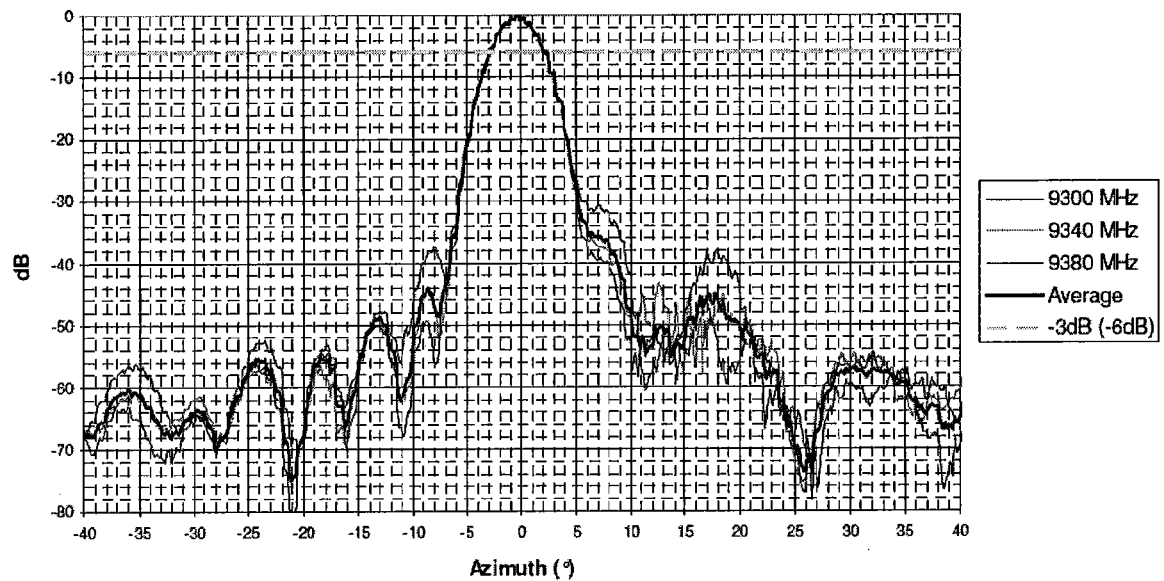
FIG. 7 is a plot of the two-way transmit/receive antenna azimuth response for a BR24 scanner (400 mm patch array; approximately 5.2° 3 dB-beamwidth) used in experiment 1 with the directional sidelobe clutter suppression system.

The two way antenna azimuth beam shape for a BR24 scanner is detailed in FIG. 7 and it can be seen that a dynamic range of 30 dB ($-20$ dBm$^2$ ... $+10$ dBm$^2$) it will start to produce excessive target azimuth (mainlobe) bloom in large targets and at 40 dB ($-20$ dBm$^2$ ... $+20$ dBm$^2$) there will sidelobe clutter at significant azimuth separation from the large target true bearing. The directional sidelobe suppression system can be applied to provide cross range sensitivity time control to assist the automatic STC adjust its range dependant sensitivity based on the presence of adjacent targets much larger (>30 dB) than the desired smallest detectable target.

Figure 8:
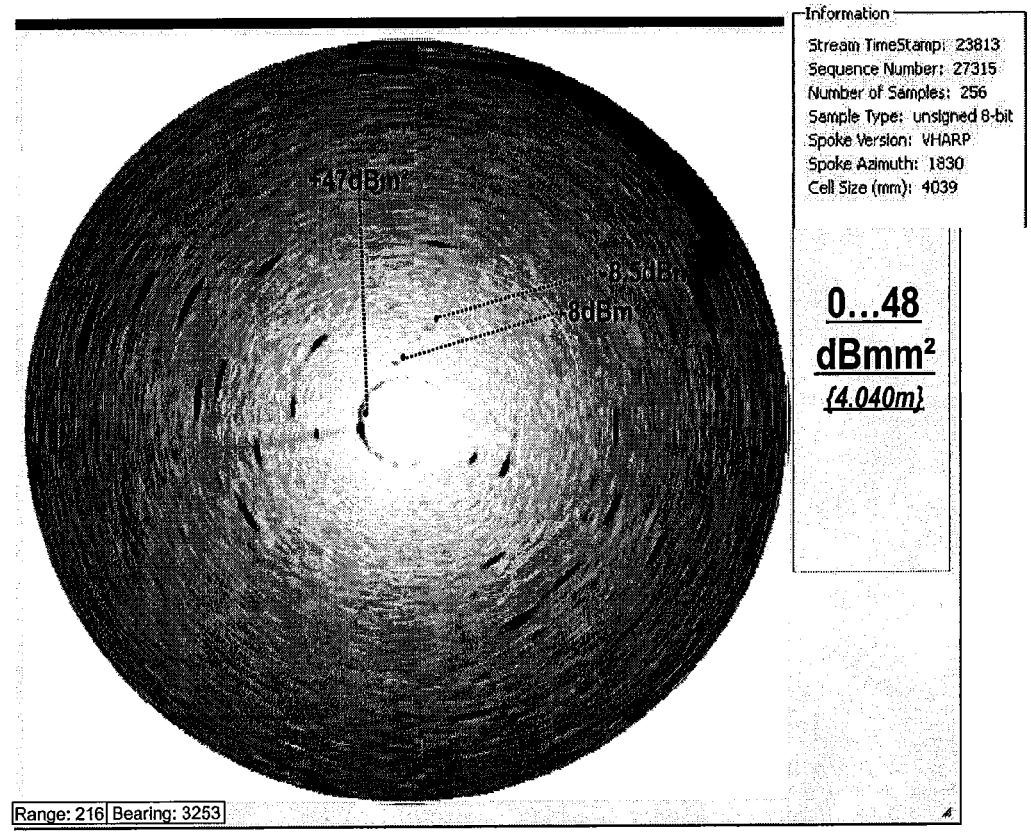
FIG. 8 is a plot of a target RCS map (0 . . . 48 dBmm$^2$) of a mid channel shipping lane (Rangitoto Channel, Auckland) with local and cargo vessel traffic used in experiment 1

The practical on water example shown in FIG. 8 highlights the case of a large container vessel (approx +47 dBm$^2$) at 120 m and at similar range to a small plastic marker (approx $-8$ dBm$^2$) at 157 m; giving a target size dynamic range of 55 dB for this scenario. In this RCS mapping, it is clear that there is sufficient signal to sea clutter ratio to easily detect the plastic marker using an appropriate automatic STC method; however the difficulty is to be able to do so without also detecting the false sidelobe clutter arc emanating from the container vessel.

Figure 9:
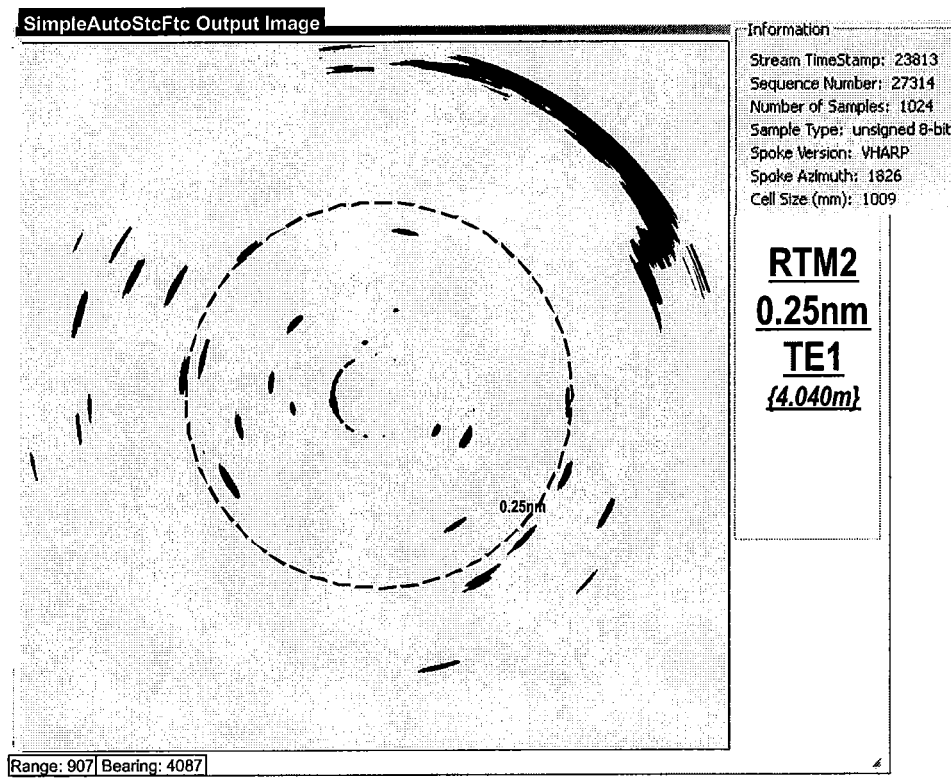
FIG. 9 is a plot of the target detection map of the target scenario shown in FIG. 8 without directional sidelobe suppression applied.

In FIG. 9, the target detection map resulting from a simplistic automatic STC scheme with no sidelobe fix provision applied to the target scenario given in FIG. 8 is shown. The scheme is obviously sufficiently sensitive to be able to detect the small plastic marker at 157 m (at least in these sea conditions) and even the other marginally smaller plastic marker at 258 m; however the sidelobe clutter arc due to the container vessel is almost 180° in extent and is a highly undesirable radar image artifact.

Figure 10:
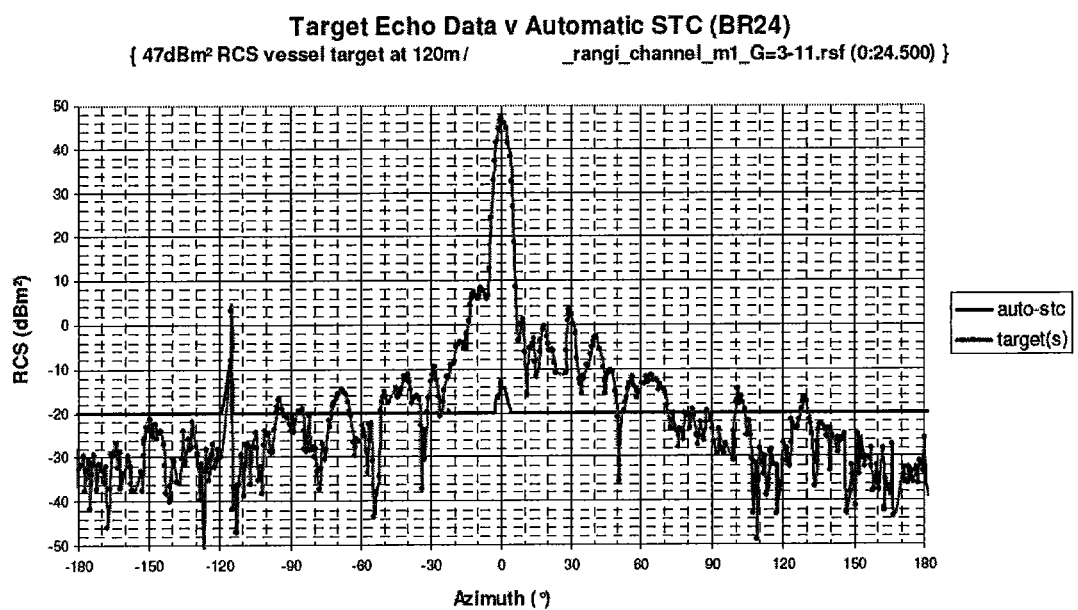
FIG. 10 is a plot of the azimuth trace of the target echo data for the 47 dBm$^2$ container vessel at 121 m from the target scenario of FIG. 8.

An azimuth trace of the target echo data and the respective automatic STC for the container vessel in this target scenario is detailed in FIG. 10 and it can be seen that the automatic STC is operating at maximum allowed sensitivity (in this case $-20$ dBm$^2$ target strengths) for most of the azimuth sweep at this range which would be expected in this low sea/rain clutter scenario. Where the automatic STC actually has responded to the high signal strength of the container vessel, it is not particularly strong an effect since the range axis dimension of the container vessel detection is only some 20 m hence along range it stands out as a very high solitary peak against the background ambient sea clutter level in the radar video. FIG. 10 shows an azimuth trace of target echo data for the 47 dBm$^2$ container vessel at 121 m extracted from the target scenario depicted in FIGS. 8 and 9 previously. Note the pulse radar interference spike at around $-115$° which can be ignored.

Figure 11:
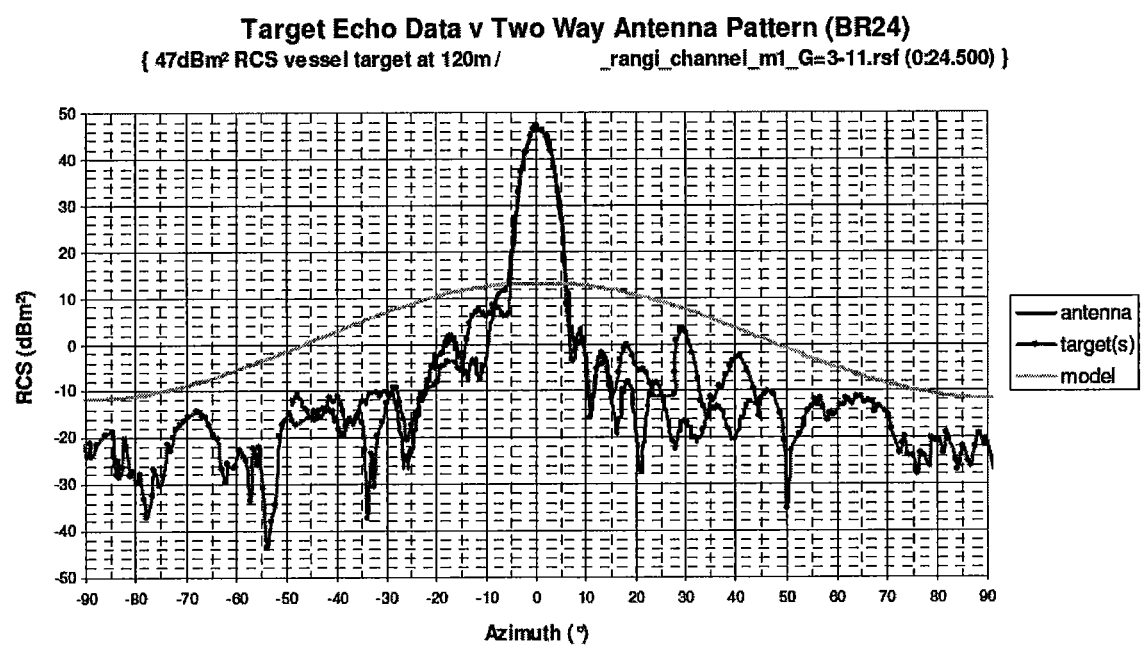
FIG. 11 is a plot of the azimuth trace of target echo data for the 47 dBm$^2$ container vessel at 121 m from the target scenario of FIG. 8, compared with the measured antenna azimuth response and a simplified raised cosine model for the antenna pattern sidelobes.

For the target scenario given in FIGS. 8 and 9, we can now apply a very basic cross range sensitivity envelope based on a simplified model of the antenna azimuth characteristic. In FIG. 11, the raised cosine function with relevant parameters is used as an approximation to the sidelobe rolloff for the BR24 antenna and this can be observed to be a suitable sensitivity limit to prevent sidelobe clutter false alarms in the final radar image. As previously described with reference to FIGS. 1 and 2, the directional sidelobe suppression method works in conjunction with sensitivity time control in that the dominant level between STC and sidelobe fix is used as the operational sensitivity at that range and direction. Hence the basic application of the directional sidelobe fix envelope is a maximum select operator between sidelobe fix and STC prior to subtraction from the (logarithmic) radar video to produce the expected target detections.

Figure 12A:
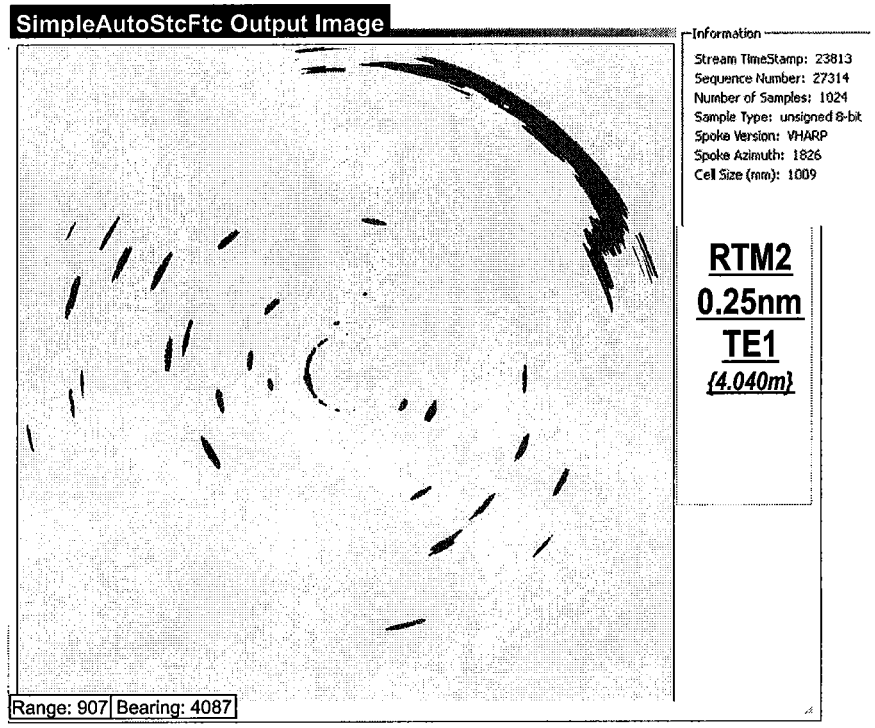
FIG. 12A is a plot of the target detection map for an automatic STC scheme applied to the radar scene of FIG. 8 without directional sidelobe suppression applied.
Figure 12B:
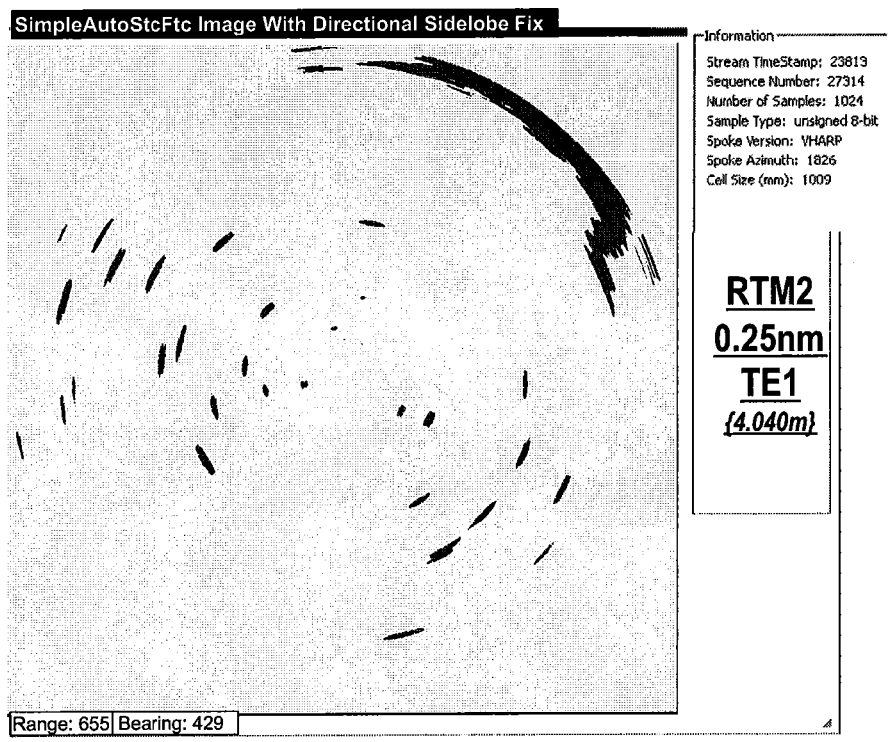
FIG. 12B is a plot of the target detection map for an automatic STC scheme applied to the radar scene of FIG. 8 with directional sidelobe suppression applied.

The resulting radar image arising from the application of the directional sidelobe suppression fix described with respect to FIG. 11 is shown in FIG. 12B, with the radar image without sidelobe suppression shown in FIG. 12A. As can be seen from this simple scenario, the directional sidelobe fix has almost perfectly removed the nuisance sidelobe clutter arc emanating from the container ship without affecting the automatic sensitivity elsewhere in the radar scene.

Omni-Directional-Sidelobe Suppression

Experiment 2

Figure 13:
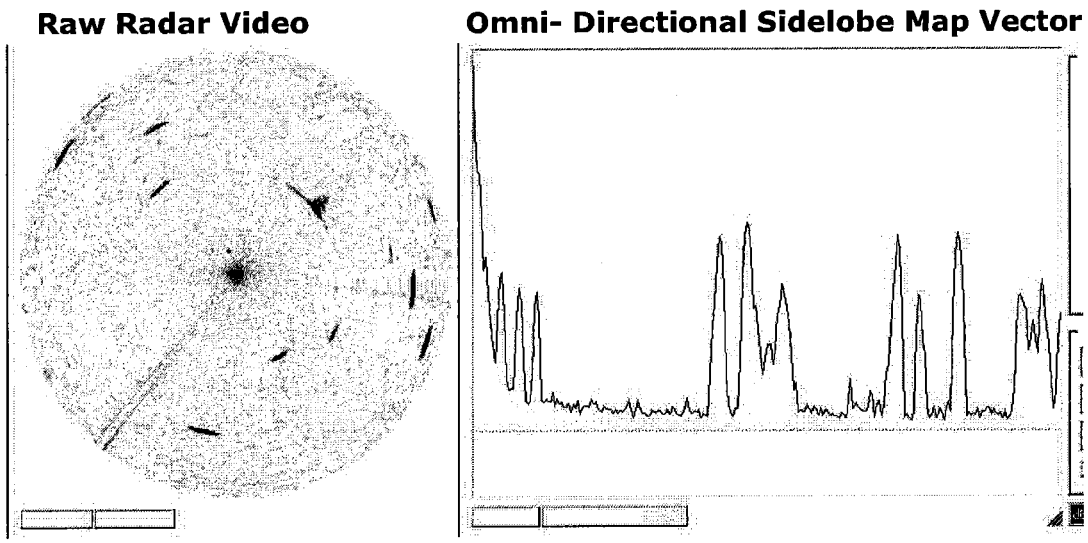
FIG. 13 is a plot of raw radar video SNR compared with 360° accumulated SNR peaks for a simple target scenario used in experiment 2, with the sidelobe map vector in full resolution with approximately 0 . . . 100 dB shown in the trace to the right of the radar image.
Figure 14:
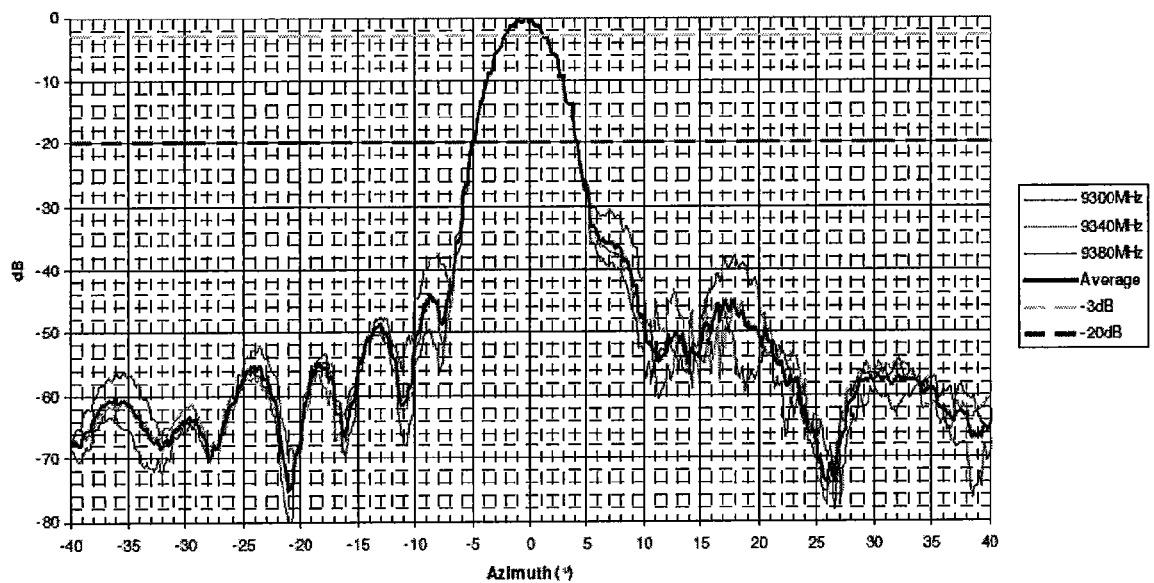
FIG. 14 is a plot of the measured two-way transmit/receive antenna azimuth response for a BR24 scanner used in experiment 2 with the omni-directional sidelobe clutter suppression system.

The sidelobe map vector detected for a simple target scenario is shown in FIG. 13. In particular, this shows raw radar video SNR compared with 360° accumulated SNR peaks for a simple target scenario. The sidelobe map vector is full resolution with approx 0 ... 100 dB shown in the trace to the right of the radar image. Each of these detected SNR peaks will be responsible for a mainlobe and sidelobe envelope determined by the radar system antenna characteristics. Where a large target is present at a particular range, the result will be mainlobe envelope spreading causing azimuth bloom of the target and the sidelobe envelopes either side of the mainlobe will cause sidelobe clutter if the peak SNR is sufficiently above the desired sensitivity at that range. To illustrate the effect, the antenna azimuth response for a BR24 antenna is shown in FIG. 14. Ideally the minimum target strength of interest might be say −10 dBm$^2$ corresponding to a small plastic marker buoy or similar hence large targets >40 dBm$^2$ can cause excessive azimuth target bloom and sidelobe clutter for this antenna response.

As previously described, the omni-directional sidelobe fix is generated by specifying a sidelobe margin for the antenna and combining this with the omni-directional sidelobe map vector to create a sensitivity-with-range upper limit that will suppress sidelobe clutter and limit azimuth bloom for the mainlobe envelope. A sidelobe margin of 20 dB is shown in FIG. 14 and this clearly suppresses all sidelobe clutter and limits the mainlobe azimuth expansion to 10° for very large targets regardless of the desired sensitivity. The resulting sidelobe fix vector 151 is detailed in FIG. 15 which clearly shows that sidelobe fix sensitivity limits are generally below the receiver noise floor (less than 0 dBsnr) in simple target scenarios other than at ranges where large SNR peaks exist. The omni-directional sidelobe map vector 152 is also shown.

The result of applying omni-directional sidelobe fix to the simple target scenario detailed previously in FIG. 13 is shown in the radar image of FIG. 16B, with FIG. 16A showing the radar image without omni-directional sidelobe fix applied. As shown, the omni-directional sidelobe suppression suppresses the sidelobe clutter and reduces large target azimuth bloom in this example.

The application of the omni-directional sidelobe fix and its effect on STC can be visualised in FIG. 17 for the simple target scenario of FIG. 13. FIG. 17 shows the omni-directional sidelobe fix trace 171 compared with fully directional STC trace 172 applied to the simple target scenario in FIG. 13 clearly showing the regional sensitivity limits imposed by the detected large targets in the radar scene at 20 dB sidelobe margin. Also shown is the theoretic detection SNR for a −10.0 dBm$^2$ (0.1 m$^2$) radar cross section target trace 173 for reference. Note the target at 65 m (first peak in trace 171) is actually a small bird at around −17.0 dBm$^2$ (0.02 m$^2$) radar cross section in this scan which is easily detectable with the directional automatic STC in these flat calm open water conditions.

As mentioned above, the various embodiments may be implemented by hardware, software, firmware, middleware, microcode, or any combination of these. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via any suitable means including memory sharing, message passing, token passing, network transmission, or similar.

A storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to, portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, such as a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of a processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of suitable storage medium. A storage medium may be coupled to the processor such that the processor can read information from, and write information to, the storage medium. In the alternative, the storage medium may be integral to the processor.

One or more of the components and functions illustrated in the figures may be rearranged and/or combined into a single component or embodied in several components without departing from the invention. Additional elements or components may also be added without departing from the invention.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A method of suppressing sidelobe clutter in a radar signal processing system that receives a radar video stream from a radar antenna scanner and applies Sensitivity Control (SC) processing to the radar video stream based on an SC threshold profile that defines an echo return intensity threshold over range, the method implemented by a processor of the radar signal processing system and comprising:

receiving the radar video stream from the radar antenna scanner;

determining the peak echo return intensity level (herein: peak return level) at each range based on radar video stream representing a full scanner sweep stored in memory of the radar signal processing system;

selectively modifying the SC threshold profile based on the determined peak echo return intensity levels from the full scanner sweep and an antenna sidelobe margin factor that is based on the antenna characteristics of the radar antenna scanner to thereby selectively reduce the sensitivity of the SC processing based on the determined peak echo return intensity levels and the antenna sidelobe margin factor; and applying SC processing to the radar video stream based on the selectively modified SC threshold profile to generate an SC processed radar video stream having reduced sidelobe clutter.

2. A method according to claim 1 wherein the radar video stream represents the echo return intensities detected by the radar antenna scanner during its 360 degree sweeps, sampled in azimuth and range, and wherein the radar video stream comprises a stream of azimuthal vector data, each azimuthal vector representing the echo return intensities at a number of range samples for an azimuthal direction in the radar antenna scanner sweep.

3. A method according to claim 2 wherein each azimuthal vector in the stream of azimuthal vector data is SC processed one by one.

4. A method according to claim 1 wherein the radar signal processing system applies SC processing in the form of Sensitivity Time Control (STC) processing to the radar video stream based on an STC threshold profile.

5. A method according to claim 1 wherein the radar signal processing system applies SC processing in the form of Sensitivity Frequency Control (SFC) based on an SFC threshold profile.

6. A method according to claim 2 wherein determining the peak return level at each range comprises determining the peak return level for each range based on the maximum echo return intensity from all or a sample of azimuthal vectors in a full 360 degree sweep of the radar antenna scanner.

7. A method according to claim 2 wherein determining the peak return level at each range comprises, for each azimuthal vector, generating a peak return level vector comprising the peak return levels at each range sample based on a buffer of the radar video stream comprising azimuthal vectors within an azimuthal buffer range relative to the azimuthal vector being SC processed, and selectively modifying the SC threshold profile comprises, for each azimuthal vector, selectively modifying the SC threshold profile based on the generated peak return level vector for the azimuthal vector prior to SC processing of the azimuthal vector.

8. A method according to claim 7 wherein the buffer of the radar video stream comprises azimuthal vectors within an azimuthal buffer range of 360 degrees centered about the azimuthal vector being SC processed.

9. A method according to claim 7 wherein the buffer of the radar video stream comprises azimuthal vectors within an azimuthal buffer range of 360 degrees occurring before the azimuthal vector being SC processed.

10. A method according to claim 2 wherein determining the peak return level at each range comprises generating a peak return level vector once for each full sweep, the peak return level vector comprising the peak return levels at each range based on a buffer of the radar video stream comprising azimuthal vectors within an azimuthal buffer range relative to the sweep, and selectively modifying the SC threshold profile comprises selectively modifying the SC profile once for each full sweep based on the generated peak return level vector for that sweep prior to SC processing of the radar video stream of the sweep.

11. A method according to claim 10 wherein the buffer of the radar video stream comprises azimuthal vectors within an azimuthal buffer range of 360 degrees preceding the sweep being SC processed.

12. A method according to claim 2 wherein each sweep of radar video stream is segmented, and determining the peak return level at each range comprises generating a peak return level vector once for each segment of the sweep, the peak return level vector comprising the peak return levels at each range based on a buffer of the radar video stream comprising azimuthal vectors within an azimuthal buffer range relative to the sweep, and selectively modifying the SC threshold profile comprises selectively modifying the SC profile once for each segment based on the generated peak return level vector for that segment prior to SC processing of the radar video stream of the segment.

13. A method according to claim 12 wherein the buffer of the radar video stream comprises azimuthal vectors within an azimuthal buffer range of 360 degrees preceding the segment being SC processed.

14. A method according to claim 1 further comprising modifying the determined peak return levels based on the antenna sidelobe margin factor to generate modified peak return levels and selectively modifying the SC threshold profile comprises selectively modifying the SC threshold profile based on the modified peak return levels.

15. A method according to claim 14 comprising selecting the antenna sidelobe margin factor based on the antenna beam pattern response of the radar antenna scanner.

16. A method according to claim 14 wherein the SC threshold profile comprises an echo return intensity threshold level for each range sample, and wherein selectively modifying the SC threshold profile comprises increasing the threshold levels of the SC threshold profile in range regions where the modified peak return levels exceeds the original threshold levels.

17. A method according to claim 16 wherein increasing the threshold levels of the SC threshold profile comprises increasing the threshold level of the SC threshold profile to a level subsequently equal to or above the corresponding modified peak return level at-ranges where the original threshold levels are exceeded by their corresponding modified peak return level.

18. A method according to claim 16 wherein the method comprises modifying the SC threshold profile when at least one or more of the modified peak return levels exceed their corresponding threshold levels of the SC threshold profile at respective ranges.

19. A method according to claim 2 wherein selectively modifying the SC threshold profile comprises selectively modifying the SC threshold profile for each new azimuthal vector in the radar video stream prior to SC processing of that new azimuthal vector.

20. A method according to claim 19 further comprising restoring the original SC threshold profile after each azimuthal vector has been SC processed or prior to each step of selectively modifying the SC threshold profile.

21. A method according to claim 1 further comprising determining estimates of the sidelobe clutter contribution levels (herein: sidelobe estimates) based on a buffer of the radar video stream and an antenna beam pattern response model of the radar antenna, and further selectively modifying the SC threshold profile based on the determined estimates of the sidelobe clutter contribution levels.

22. A radar signal processing system that receives a radar video stream from a radar antenna scanner and applies Sensitivity Control (SC) processing to the radar video stream based on an SC threshold profile that defines an echo intensity threshold over range, the system comprising:
- a processor; and
- memory associated with the processor; and
- wherein the processor is configured to:
  - receive the radar video stream from the radar antenna scanner;
  - determine the peak echo return intensity level (herein: peak return level) at each range based on radar video stream representing a full scanner sweep stored in memory;
  - selectively modify the SC threshold profile based on the determined peak echo return intensity levels from the full scanner sweep and an antenna sidelobe margin factor that is based on the antenna characteristics of the radar antenna scanner to thereby selectively reduce the sensitivity of the SC processing based on the determined peak echo return intensity levels and the antenna sidelobe margin factor; and
  - apply SC processing to the radar video stream based on the selectively modified SC threshold profile to generate an SC processed radar video stream having reduced sidelobe clutter.

23. A radar signal processing system according to claim 22 wherein the radar video stream represents the echo return intensities detected by the radar antenna scanner during its 360 degree sweeps, sampled in azimuth and range, and wherein the radar video stream comprises a stream of azimuthal vector data, each azimuthal vector representing the echo return intensities at a number of range samples for an azimuthal direction in the radar antenna scanner sweep.

24. A radar signal processing system according to claim 23 wherein the processor is configured to apply SC processing to each azimuthal vector in the stream of azimuthal vector data one by one.

25. A radar signal processing system according to claim 22 wherein the processor is configured to apply SC processing in the form of Sensitivity Time Control (STC) processing to the radar video stream based on an STC threshold profile or SC processing in the form of Sensitivity Frequency Control (SFC) based on an SFC threshold profile.

26. A radar signal processing system according to claim 23 wherein the processor is configured to determine the peak return level at each range by determining the peak return level for each range based on the maximum echo return intensity from all or a sample of azimuthal vectors in a full 360 degree sweep of the radar antenna scanner.

27. A radar signal processing system according to claim 23 wherein the processor is configured to determine the peak return level at each range by, for each azimuthal vector, generating a peak return level vector comprising the peak return levels at each range sample based on a buffer of the radar video stream comprising azimuthal vectors within an azimuthal buffer range relative to the azimuthal vector being SC processed, and wherein the processor is configured to selectively modify the SC threshold profile by, for each azimuthal vector, selectively modifying the SC threshold profile based on the generated peak return level vector for the azimuthal vector prior to SC processing of the azimuthal vector.

28. A radar signal processing system according to claim 27 wherein the buffer of the radar video stream comprises azimuthal vectors within an azimuthal buffer range of 360 degrees centered about or occurring before the azimuthal vector being SC processed.

29. A radar signal processing system according claim 23 wherein the processor is configured to determine the peak return level at each range by generating a peak return level vector once for each full sweep, the peak return level vector comprising the peak return levels at each range based on a buffer of the radar video stream comprising azimuthal vectors within an azimuthal buffer range of 360 degrees preceding the sweep being SC processed, and wherein the processor is configured to selectively modify the SC threshold profile by selectively modifying the SC profile once for each full sweep based on the generated peak return level vector for that sweep prior to SC processing of the radar video stream of the sweep.

30. A radar signal processing system according claim 23 wherein each sweep of radar video stream is segmented, and the processor is configured to determine the peak return level at each range by generating a peak return level vector once for each segment of the sweep, the peak return level vector comprising the peak return levels at each range based on a buffer of the radar video stream comprising azimuthal vectors within an azimuthal buffer range of 360 degrees preceding the segment being SC processed, and wherein the processor is configured to selectively modify the SC threshold profile by selectively modifying the SC profile once for each segment based on the generated peak return level vector for that segment prior to SC processing of the radar video stream of the segment.

31. A radar signal processing system according to claim 22 wherein the processor is further configured to modify the determined peak return levels based on the antenna sidelobe margin factor to generate modified peak return levels and wherein the processor is configured to selectively modify the SC threshold profile by selectively modifying the SC threshold profile based on the modified peak return levels.

32. A radar signal processing system according to claim 31 wherein the processor is configured to select the antenna sidelobe margin factor based on the antenna beam pattern response of the radar antenna scanner.

33. A radar signal processing system according to claim 31 wherein the SC threshold profile comprises an echo return intensity threshold level for each range sample and wherein the processor is configured to selectively modify the SC threshold profile by increasing the threshold levels of the SC threshold profile in range regions where the modified peak return levels exceeds the original threshold levels.

34. A radar signal processing system according to claim 33 wherein the processor is configured to increase the threshold levels of the SC threshold profile by increasing the threshold level of the SC threshold profile to a level subsequently equal to or above the corresponding modified peak return level at ranges where the original threshold levels are exceeded by their corresponding peak return level.

35. A radar signal processing system according claim 33 wherein the processor is configured to modify the SC threshold profile when at least one or more of the modified peak return levels exceed their corresponding threshold levels of the SC threshold profile at respective ranges.

36. A radar signal processing system according to claim 23 wherein the processor is configured to selectively modify the SC threshold profile by selectively modifying the SC threshold profile for each new azimuthal vector in the radar video stream prior to SC processing of that new azimuthal vector and then restore the original SC threshold profile after each azimuthal vector has been SC processed or prior to each step of selectively modifying the SC threshold profile.

37. A radar signal processing system according to claim 22 wherein the processor is further configured to determine estimates of the sidelobe clutter contribution levels (herein: sidelobe estimates) based on a buffer of the radar video stream and an antenna beam pattern response model of the radar antenna, and wherein the processor is configured to further selectively modify the SC threshold profile based on the determined estimates of the sidelobe clutter contribution levels.

* * * * *